(12) United States Patent
Biscan

(10) Patent No.: US 11,446,994 B2
(45) Date of Patent: Sep. 20, 2022

(54) DYNAMIC ROOF TOP FOR TRUCK BODY AND METHOD OF OPERATION

(71) Applicant: Stahl/Scott Fetzer Company, Wooster, OH (US)

(72) Inventor: Kent R. Biscan, Clinton, OH (US)

(73) Assignee: Stahl/Scott Fetzer Company, Wooster, OH (US)

( * ) Notice: Subject to any disclaimer, the term of this patent is extended or adjusted under 35 U.S.C. 154(b) by 0 days.

(21) Appl. No.: 16/895,226

(22) Filed: Jun. 8, 2020

(65) Prior Publication Data
US 2020/0369132 A1    Nov. 26, 2020

Related U.S. Application Data

(63) Continuation of application No. 29/691,798, filed on May 20, 2019, now Pat. No. Des. 914,579.
(Continued)

(51) Int. Cl.
*B60J 7/04* (2006.01)
*B60P 7/02* (2006.01)
(Continued)

(52) U.S. Cl.
CPC ............. *B60J 7/1607* (2013.01); *B60J 7/041* (2013.01); *B60P 7/02* (2013.01); *B60J 7/047* (2013.01)

(58) Field of Classification Search
CPC ....... B60J 7/041; B60J 7/02; B60J 7/04; B60J 7/047; B60J 7/16; B60J 7/1607;
(Continued)

(56) References Cited

U.S. PATENT DOCUMENTS 696,409 A *   4/1902   Brill
1,713,923 A   5/1929   Grover
(Continued)

FOREIGN PATENT DOCUMENTS

FR      2850090      *   7/2004

OTHER PUBLICATIONS (2) Pictures illustrating images of removable truck roofs in the prior art. The removable roofs illustrated in the images were on sale in the U.S. at least more than one-year prior to the filing of the subject application, namely the sale occurred earlier than May 19, 2018 (1) page.

(Continued)

*Primary Examiner* — Dennis H Pedder
(74) *Attorney, Agent, or Firm* — Tarolli, Sundheim, Covell & Tummino LLP; John A. Yarga, Esq.

(57) ABSTRACT

A dynamic roof top for a truck body and method of assembly is provided. The dynamic roof top comprises at least one dynamic panel having a plurality of wheels for translating the at least one dynamic panel from an extended or closed position to a retracted or opened position and from the retracted or opened position to the extended or closed position. A static panel is included that allows the at least one dynamic panel to obtain and enveloped condition between the dynamic panel and the static panel. A rail system is also provided to allow the dynamic panel to translate from the extended or closed position to a retracted or opened position and from the retracted or open position to the extended or closed position.

20 Claims, 37 Drawing Sheets

Related U.S. Application Data

(60) Provisional application No. 62/858,603, filed on Jun. 7, 2019.

(51) Int. Cl.
 *B60J 7/16* (2006.01)
 *B60J 7/047* (2006.01)

(58) Field of Classification Search
 CPC ... B60J 7/1856; B60J 7/19; B60J 7/194; B60J 7/196
 USPC .......................... 296/100.01, 2, 3, 4, 12, 105
 See application file for complete search history.

(56) References Cited

U.S. PATENT DOCUMENTS

| | | | |
|---|---|---|---|
| D143,990 S | 2/1946 | Powers | |
| 2,846,262 A | 8/1958 | Ray | |
| 3,168,345 A | 2/1965 | Roberts | |
| 3,179,464 A | 4/1965 | McBurney | |
| 3,342,523 A * | 9/1967 | Lutgen | B61D 39/003 |
| | | | 296/100.03 |
| 3,363,938 A | 1/1968 | Schultz | |
| 3,379,468 A | 4/1968 | Woodward | |
| 3,572,821 A | 3/1971 | Van Antwerp | |
| 3,954,296 A | 5/1976 | Patnode | |
| 4,265,479 A | 5/1981 | Langston | |
| D264,576 S | 5/1982 | Godwin | |
| 4,948,193 A | 8/1990 | Weaver | |
| 5,064,240 A | 11/1991 | Kuss | |
| D342,930 S | 1/1994 | Lewellen et al. | |
| D343,814 S | 2/1994 | Michel | |
| D351,823 S | 10/1994 | Lewellen | |
| D364,591 S | 11/1995 | Lewellen | |
| 5,538,313 A * | 7/1996 | Henning | B60J 7/065 |
| | | | 296/100.12 |
| D381,953 S | 8/1997 | Collins | |
| 5,772,271 A | 6/1998 | Sanders | |
| D397,560 S | 9/1998 | Socha | |
| D400,124 S | 10/1998 | Mason | |
| 6,017,082 A * | 1/2000 | Leoni | B60J 7/02 |
| | | | 296/100.03 |
| 6,059,349 A * | 5/2000 | Doll | B60J 7/026 |
| | | | 296/100.03 |
| D431,225 S | 9/2000 | Perlman | |
| D431,499 S | 10/2000 | Schwalbe | |
| D489,673 S | 5/2004 | Block | |
| D514,986 S | 2/2006 | Swails | |
| D563,272 S | 3/2008 | Hammick | |
| D610,067 S | 2/2010 | Frankham | |
| D619,078 S | 7/2010 | Frankham | |
| D638,343 S | 5/2011 | Kramer | |
| 8,082,698 B2 | 12/2011 | Drake | |
| D661,229 S | 6/2012 | O'Neill | |
| D680,942 S | 4/2013 | Champe | |
| D743,844 S | 11/2015 | Khoroushi | |
| D758,252 S | 6/2016 | Murray | |
| D762,145 S | 7/2016 | Van Bosstraeten | |
| D790,397 S | 6/2017 | Kharoushi | |
| D812,545 S | 3/2018 | Donohoe | |
| D852,113 S | 6/2019 | Williams | |
| D878,248 S | 3/2020 | King | |
| 2006/0192406 A1 | 8/2006 | Seiberling | |
| 2014/0216238 A1 | 8/2014 | Pfennig | |
| 2015/0130211 A1 | 5/2015 | Parshall | |

OTHER PUBLICATIONS

Animal Truck Toppers, AlumLine.com, [online], [site visited Jun. 25, 2020], URL:https://www.alumline.com/products-by-use/livestock-and-ranch/animal-poppers-and-toppers/animal-truck-toppers (Year: 2020) (3 pages).

2017 Toyota Revo Samson 'Truework' Hardtop Canopy, NJaluminumLinings.com, [online], [site visited Jun. 25, 2020]. URL:https://www.njaluminiumlinings/com/2017-toyota-revo-samson-truework-hardtop-canopy.html (Year: 2020) (4 pages).

An Exceptionally Well Organized Pickup, JLConline.com, Posted on: Apr. 7, 2014, By David Frane, [online], [site visited Jun. 25, 2020]. URL:https://www.jlconline.com/tools/trucks-equipment/an-exceptionally-well-organized-pickup 0 (Year: 2014) (5 pages).

\* cited by examiner

DYNAMIC ROOF TOP FOR TRUCK BODY AND METHOD OF OPERATION

CROSS REFERENCES TO RELATED APPLICATIONS

The following application claims priority under 35 U.S.C. § 119(e) to co-pending U.S. Provisional Patent Application Ser. No. 62/858,603 filed Jun. 7, 2019 entitled DYNAMIC ROOF TOP FOR TRUCK BODY AND METHOD OF OPERATION and priority under 35 U.S.C. § 120 as a continuation-in-part to co-pending U.S. Design Patent Application Ser. No. 29/691,798 filed May 20, 2019 entitled TRUCK BODY ROOF TOP HAVING A DYNAMIC ASPECT IN THE ROOF TOP. The above-identified applications from which priority is claimed are incorporated herein by reference in their entireties for all purposes.

TECHNICAL FIELD

The present disclosure relates to a dynamic roof top for a truck body and a method of assembly and operation, and more particularly, a dynamic roof top that comprises one or more moveable interlocking sections that retract to provide access to a truck bed surrounded by the truck body and dynamic roof top and that extend to provide closure or coverage the bed.

BACKGROUND

There exists a need to deploy material for transport onto a truck bed that contains side walls, such as a conventional truck 10 illustrated in FIG. 1A. The conventional truck 10 includes a body 12, body roof 14, cab 16 (containing an engine and transmission), a chassis 18, and truck bed 19. The material shipped is typically inserted through an opening 20 onto the bed 19 and retained by sides walls 24A/24B, a tail gate 26, and a cab wall 28.

The conventional truck 10 has been further modified over the years to provide a removable body roof 14 by attaching lift cables to hooks 15A-15D and lifting several panels 14A-14D individually in the direction of arrow A from the truck 10. Alternatively, the removable body roof 14 can be removed as a single piece or all panels at once by a fork truck 22 in the direction of arrow C, as illustrated in FIG. 1B.

Other types of trucks include consumer pick-ups purchased traditionally at a dealership, dump trucks (in which the bed 19 rotates in the direction of arrow B), arborist's trucks, or a commercial service trucks, as illustrated in U.S. design patent number D342,930, assigned to the applicant of the present disclosure. The ornamental design and images representing a commercial service truck are incorporated herein by reference for all purposes. Consumer pick-ups, dump trucks, arborists trucks, and commercial service trucks like the conventional truck 10, all include, side walls and a body roof that is removable for storage of contents on the truck's bed during transport (all collectively hereinafter "truck or trucks"). It should be appreciated that the removal of the truck's roof allows for greater access to truck's bed, for example, for large branches, trees, chippings, and mulch frequently used by arborist.

The current roof panels 14A-14D are relatively heavy, weighing approximately two-hundred and fifty pounds each, precluding manual removal. While the collective lifting of a roof top (illustrated in FIG. 1B) is an even greater task, requiring the fork truck 22 illustrated in FIG. 1B, or other mechanical means.

SUMMARY

One example embodiment of the present disclosure includes a dynamic roof top for a truck body and method of assembly is provided. The dynamic roof top comprises at least one dynamic panel having a plurality of wheels for translating the at least one dynamic panel from an extended or closed position to a retracted or opened position and from the retracted or opened position to the extended or closed position. A static panel is included that allows the at least one dynamic panel to obtain and enveloped condition between the dynamic panel and the static panel. A rail system is also provided to allow the dynamic panel to translate from the extended or closed position to a retracted or opened position and from the retracted or open position to the extended or closed position.

Another aspect of the present disclosure includes a method of providing a closure for a roof top for a truck body, the method comprising the steps of: providing at least one dynamic panel moveably supported by first and second sidewalls that span a truck bed; translating the at least one dynamic panel from an extended or closed position to a retracted or opened position and from the retracted or opened position to the extended or closed position by a rail system comprising first and second rails each located on one of the first and second sidewalls of the truck, the first and second rails having a plurality of wheels coupled to the at least one dynamic panel, the wheels rotate along the track during translation of the dynamic panel; and providing a static panel that upon translating the at least one dynamic panel to an open or retracted position obtains an enveloped condition between the dynamic panel and the static panel.

A dynamic roof top for a truck body, the dynamic roof top comprising: first and second dynamic panels that translate from an extended or closed position to a retracted or opened position and from the retracted or opened position to the extended or closed position; a static panel that allows the first and second dynamic panels to obtain and enveloped condition between the first and second dynamic panels and the static panel; a rail system to allow the dynamic panel to translate from the extended or closed position to a retracted or opened position and from the retracted or open position to the extended or closed position; and first and second sub-walls and the rail system comprising first and second rails coupled to respective first and second sub-walls and third and fourth rails coupled to respective first and second sub-walls, the first and second rails translate the first dynamic panel from the extended or closed position to a retracted or opened position and from the retracted or open position to the extended or closed position, the third and fourth rails translate the second dynamic panel from the extended or closed position to a retracted or opened position and from the retracted or open position to the extended or closed position.

BRIEF DESCRIPTION OF THE DRAWINGS

The foregoing and other features and advantages of the present disclosure will become apparent to one skilled in the art to which the present invention relates upon consideration of the following description of the invention with reference to the accompanying drawings, wherein like reference numerals refer to like parts unless described otherwise throughout the drawings and in which:

FIG. 1 is a fully closed upper-right perspective view, illustrating a truck body having a dynamic roof top constructed in accordance with one example embodiment of the present disclosure;

FIG. 21A is a side elevation view illustrating a rail and wheel assembly in accordance with one example embodiment of the present disclosure;

Figure 1A:
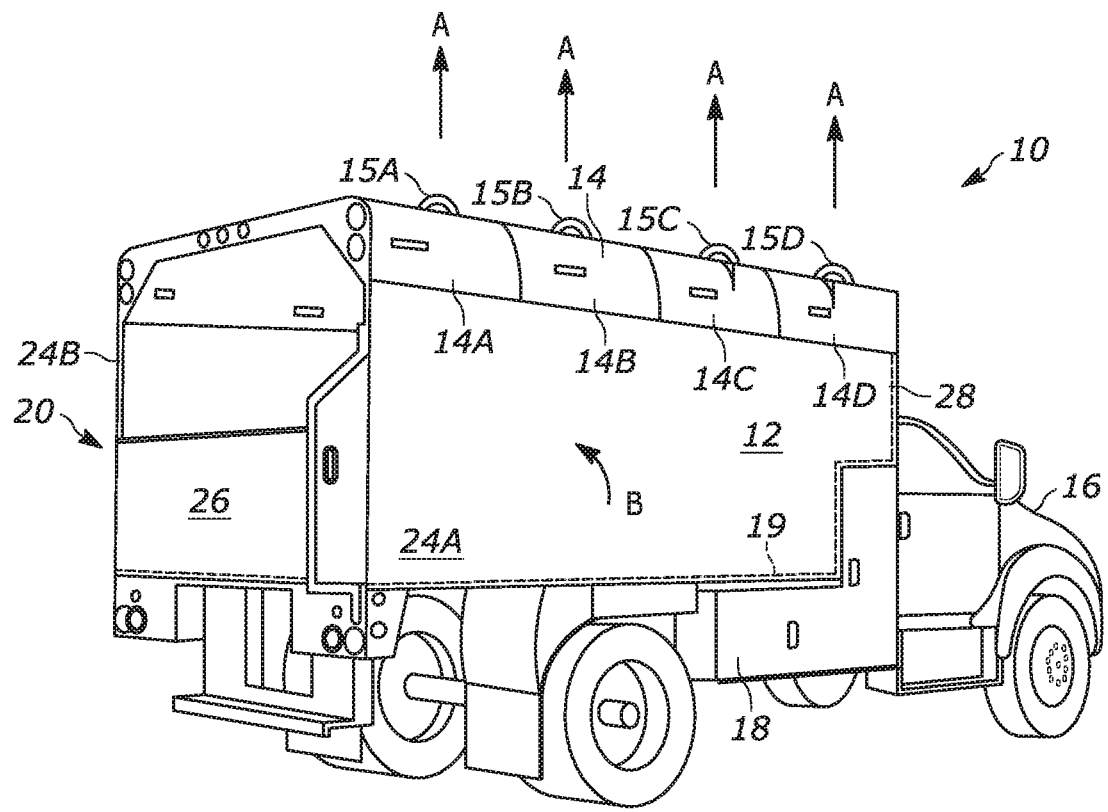
FIG. 1A is a conventional truck of the prior art with a removable body roof.
Figure 1B:
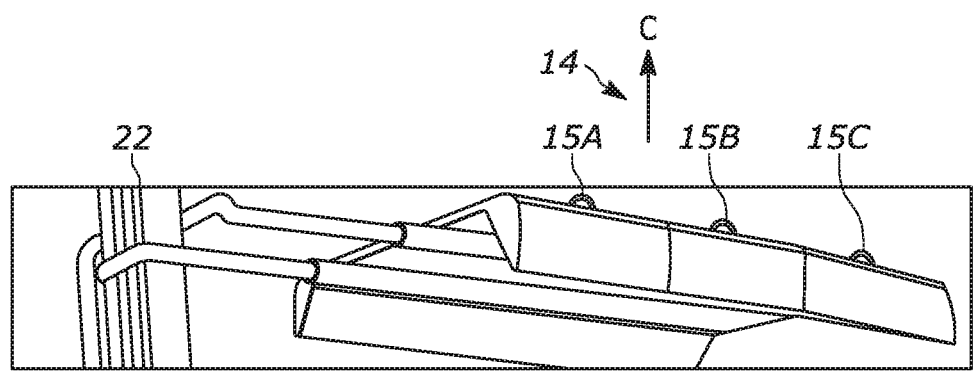
FIG. 1B is a conventional truck removable body roof of the prior art being removed with a fork truck.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Referring now to the figures generally wherein like numbered features shown therein refer to like elements throughout unless otherwise noted. The present disclosure relates to a dynamic roof top for a truck body and a method of assembly and operation, and more particularly, a dynamic roof top that comprises one or more moveable interlocking sections that retract to provide access to a truck bed surrounded by the truck body and dynamic roof top and that extend to provide closure or coverage the bed.

FIGS. 1-22 illustrate a dynamic roof top 100 for a truck body 102 constructed in accordance with one example embodiment. The truck and body 102 supporting the dynamic roof top 100 can be any form of truck and body style, including but not limited to, consumer pick-ups, dump trucks, arborists trucks, commercial service trucks, and the like, having side walls 112 and a truck bed 119 (all collectively or independently used hereinafter as "truck" or "trucks"). The truck body 102 can have (but it is not required for supporting the dynamic roof top 100 on or to the truck body 102) rear doors (not shown), a tailgate 120, and/or a cab wall 122.

In one example embodiment, the dynamic roof top 100 includes interlocking sections comprising at least one dynamic panel 130 or 132 and a static panel 134. In the illustrated example embodiment of FIGS. 1-23, two dynamic panels are shown, a first dynamic panel 130 and a second dynamic panel 132 along with a static panel 134. It should be appreciated that the dynamic roof top 100 could include only a single dynamic panel 130 wherein the size of the dynamic panel and static panel are larger to be the same size as two dynamic panels, while the operation and construction remains substantially unchanged.

Figure 11:
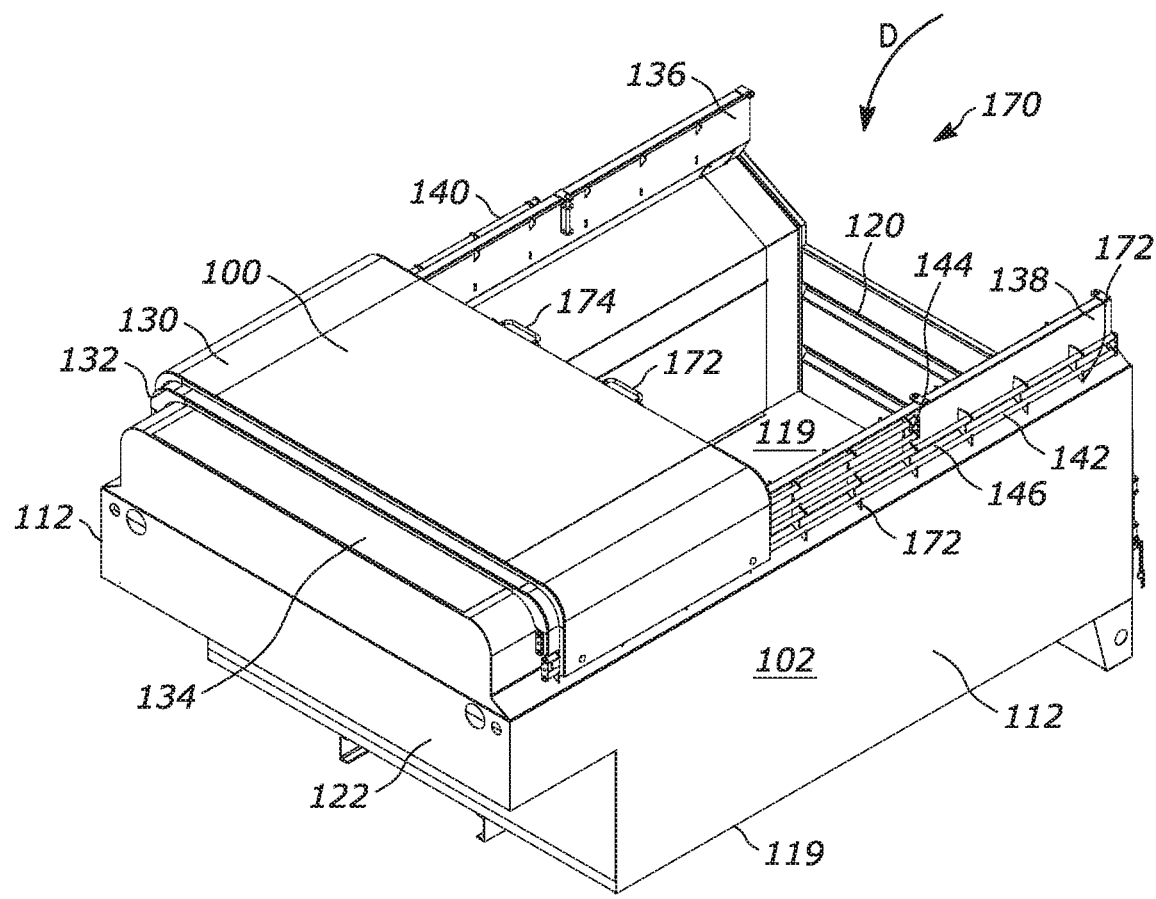
FIG. 11 is a truck body having a fully opened dynamic roof top, illustrating an upper-right perspective view thereof.
Figure 12:
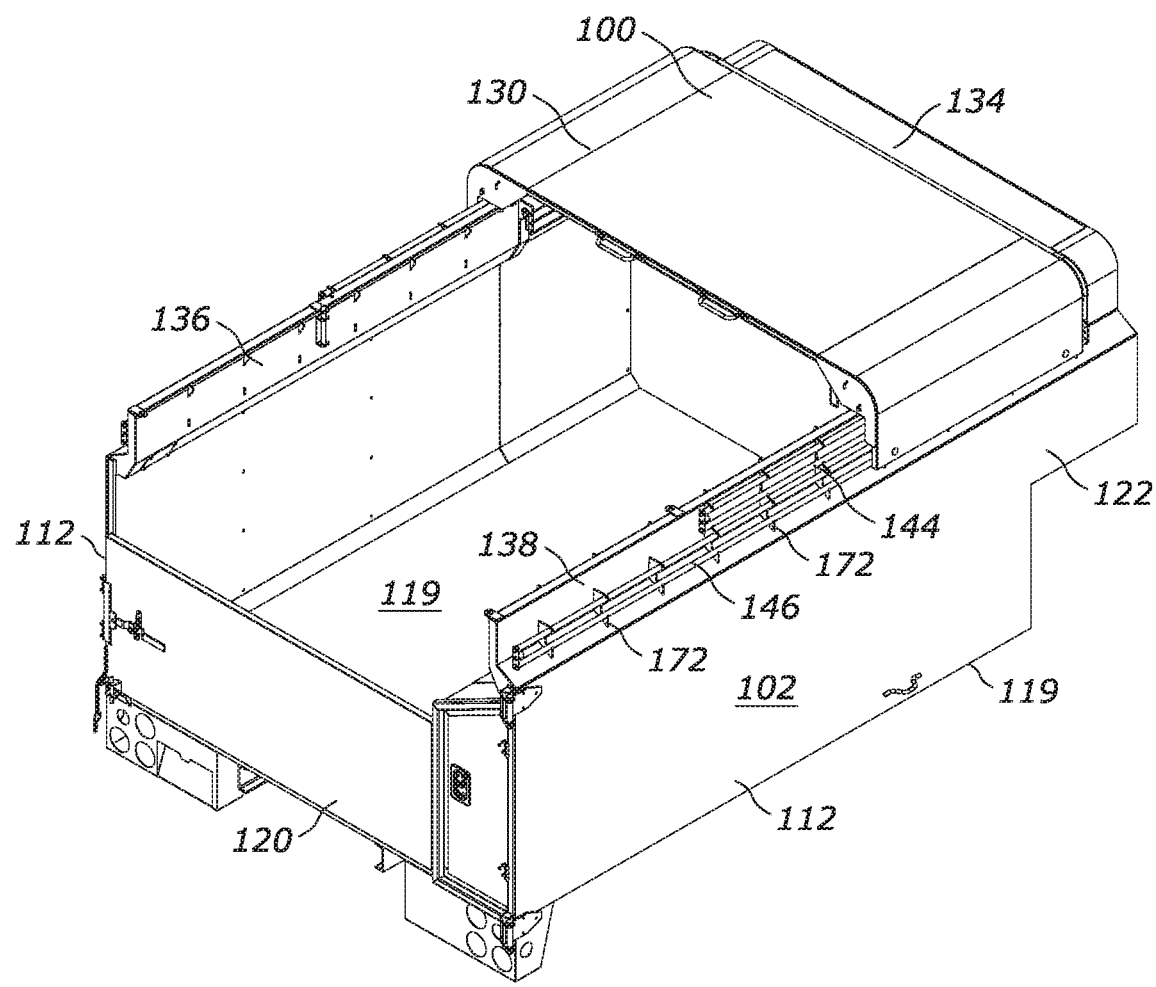
FIG. 12 is a truck body having a fully opened dynamic roof top, illustrating an upper-left perspective view thereof.
Figure 13:
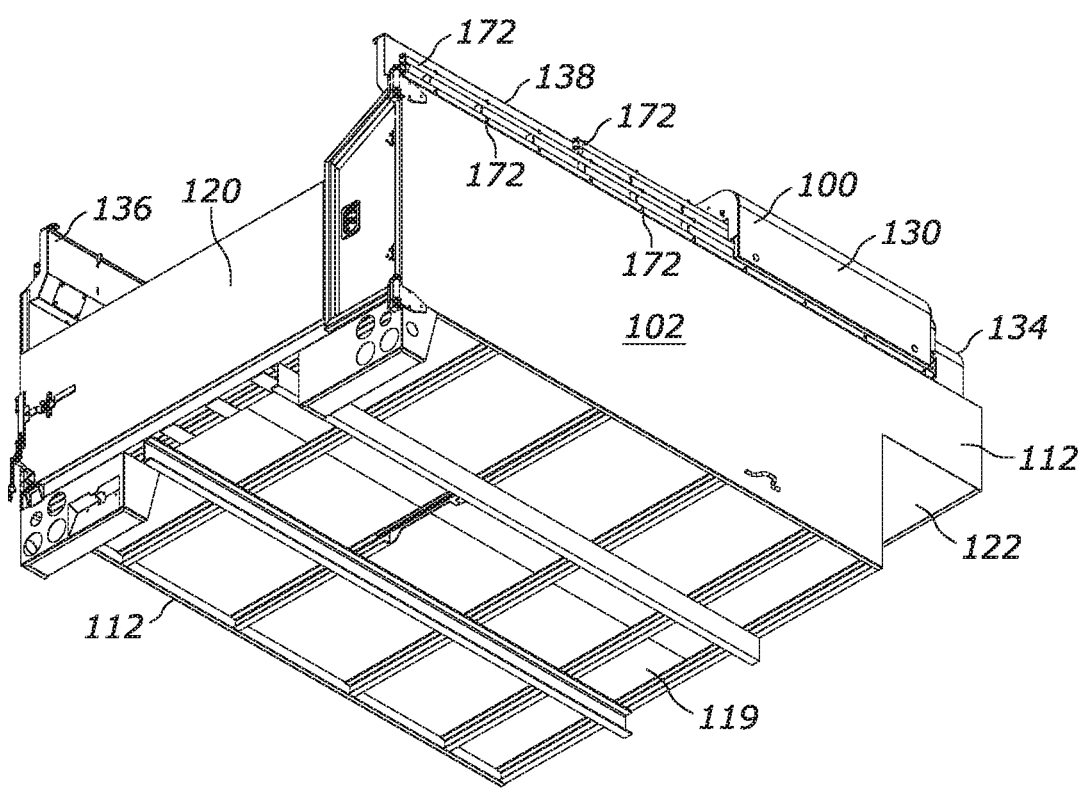
FIG. 13 is a truck body having a fully opened dynamic roof top, illustrating a lower-left perspective view thereof.
Figure 14:
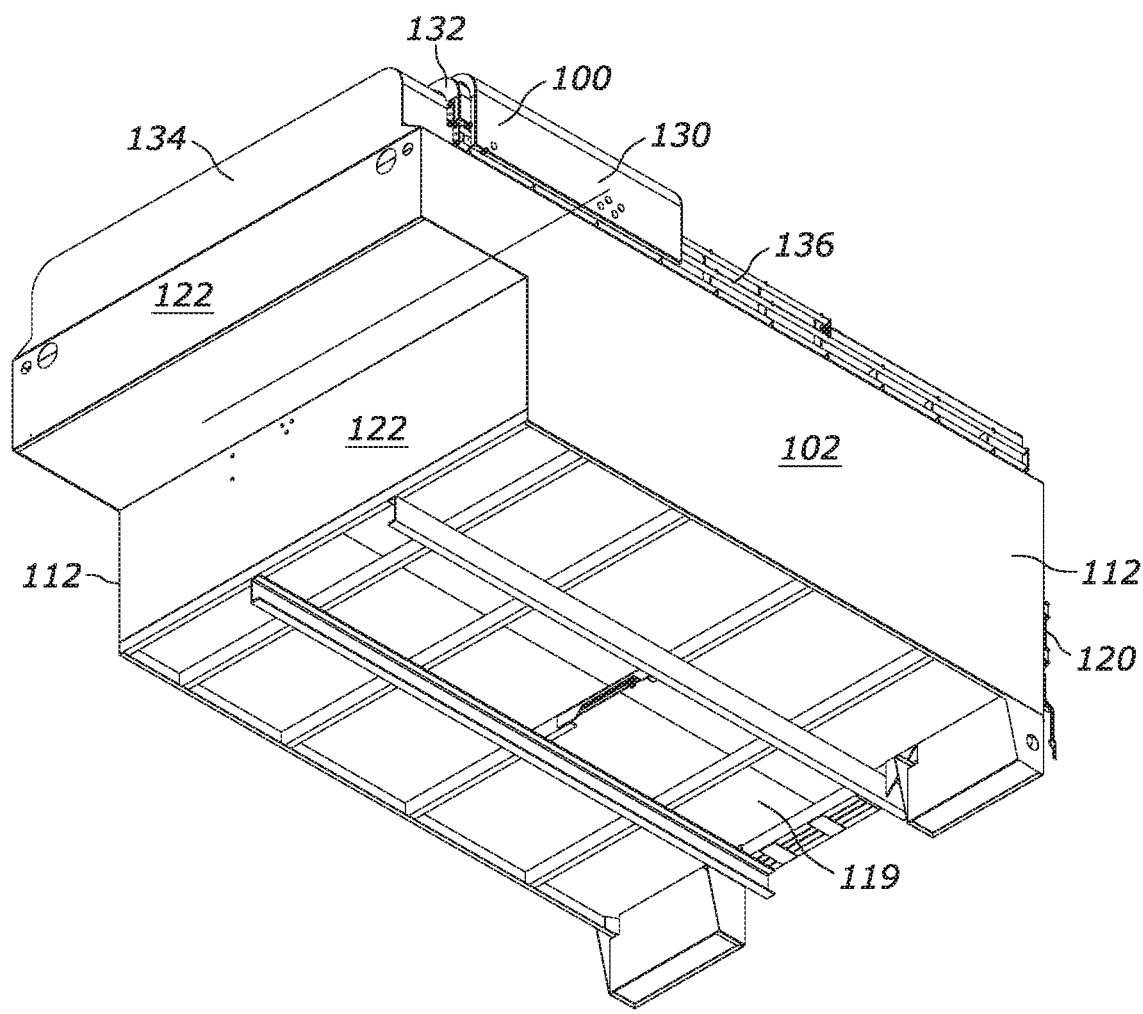
FIG. 14 is a truck body having a fully opened dynamic roof top, illustrating a lower-right perspective view thereof.
Figure 15:
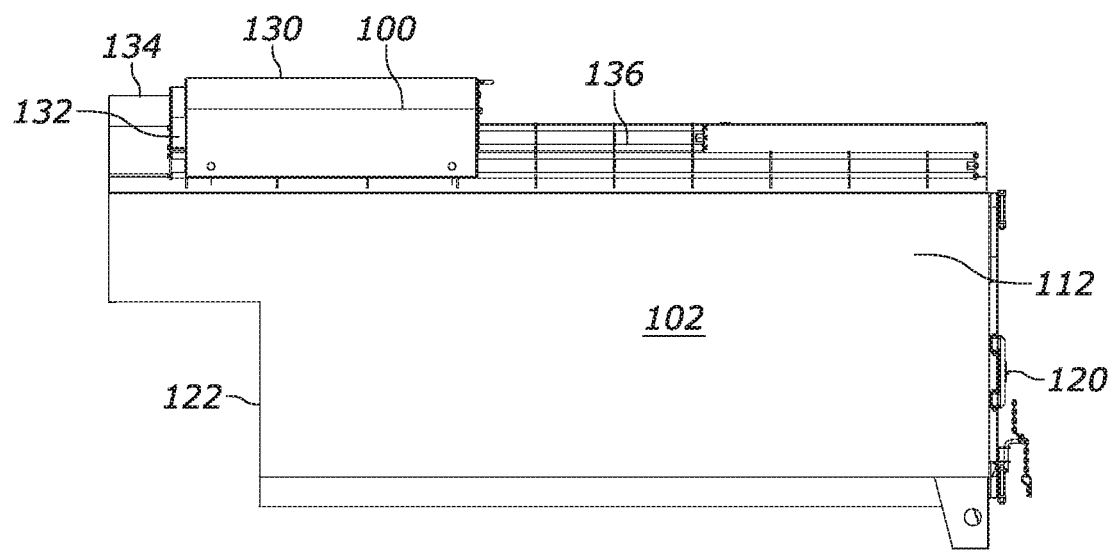
FIG. 15 is a truck body having a fully opened dynamic roof top, illustrating a right-side elevation view thereof.
Figure 16:
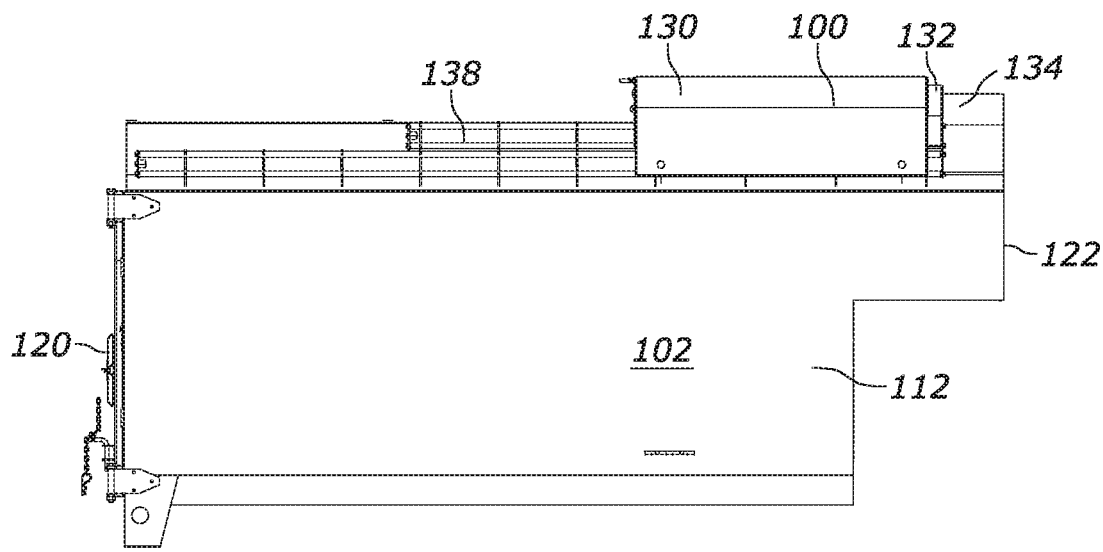
FIG. 16 is a truck body having a fully opened dynamic roof top, illustrating a left-side elevation view thereof.
Figure 17:
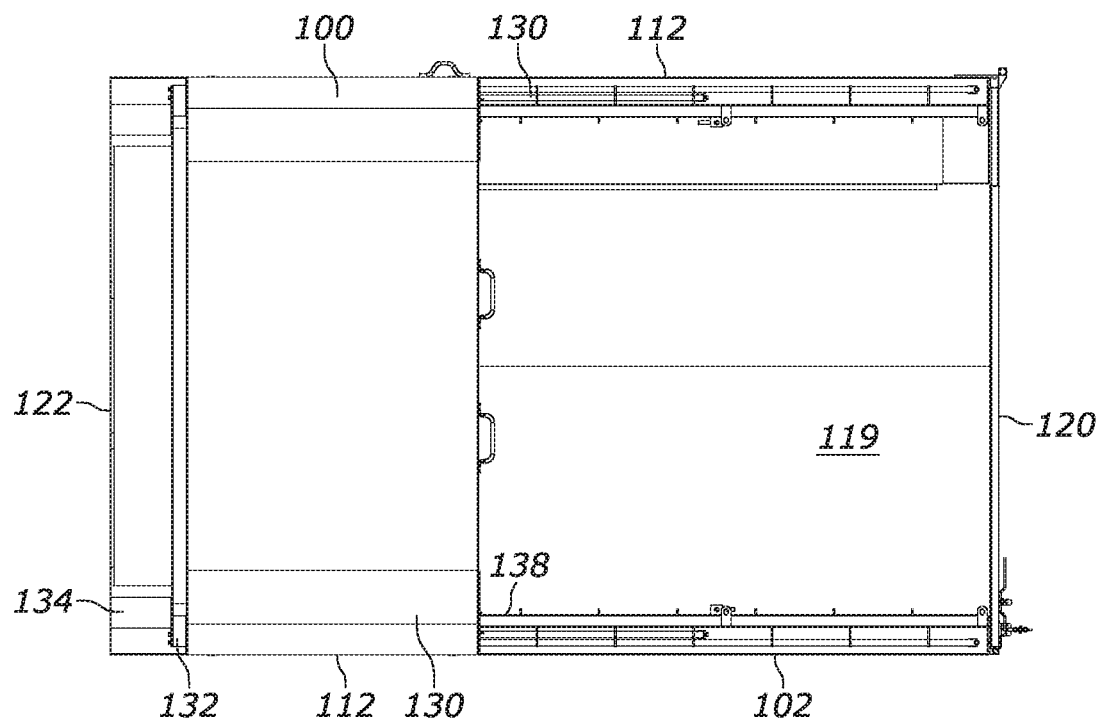
FIG. 17 is a truck body having a fully opened dynamic roof top, illustrating a top-plan view thereof.
Figure 18:
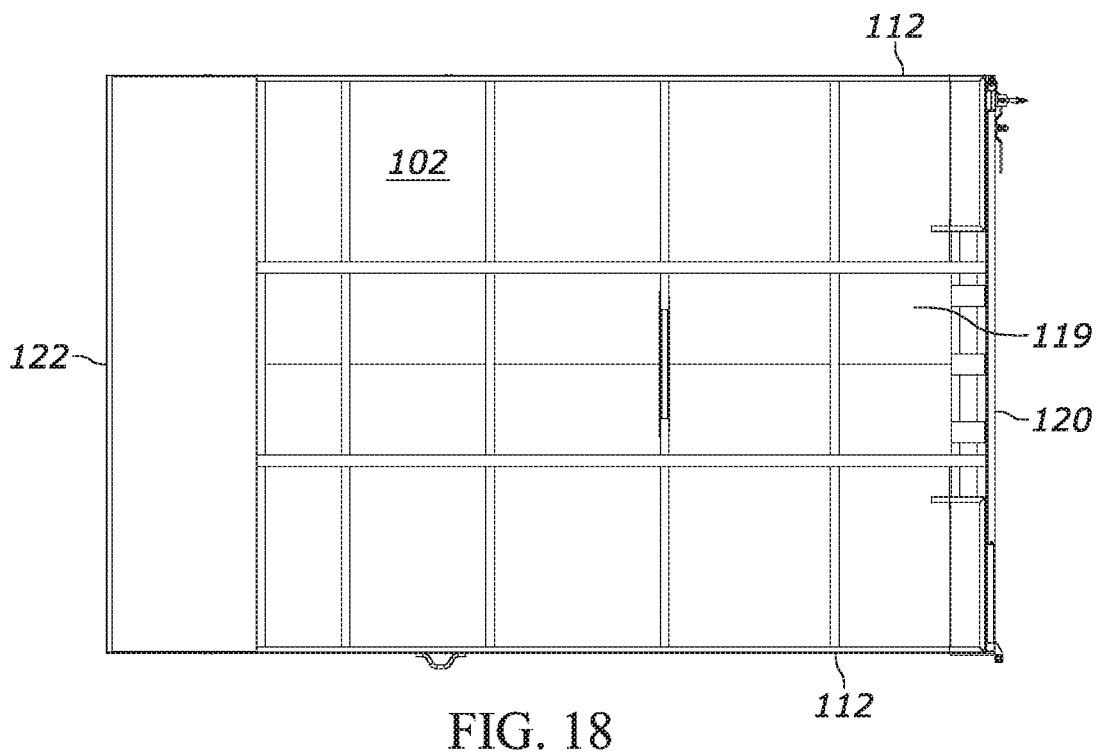
FIG. 18 is a truck body having a fully opened dynamic roof top, illustrating a bottom-plan view thereof.
Figure 19:
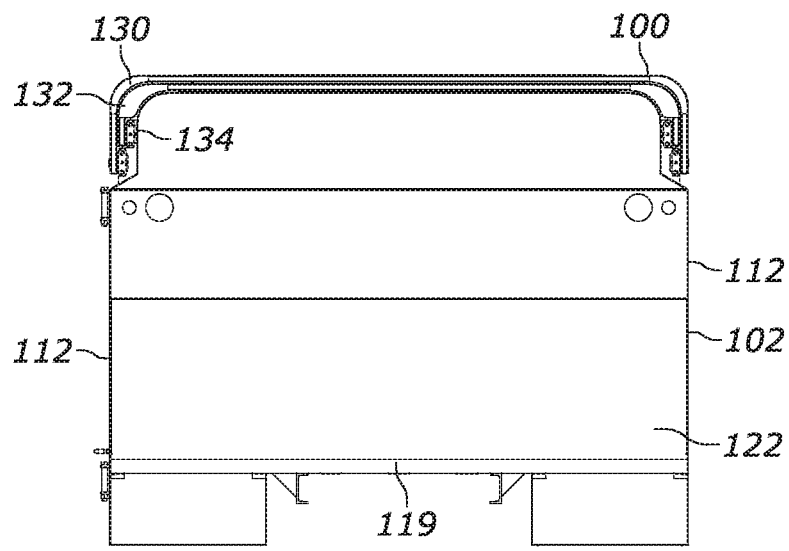
FIG. 19 is a truck body having a fully opened dynamic roof top, illustrating a front-elevation view thereof.
Figure 20:
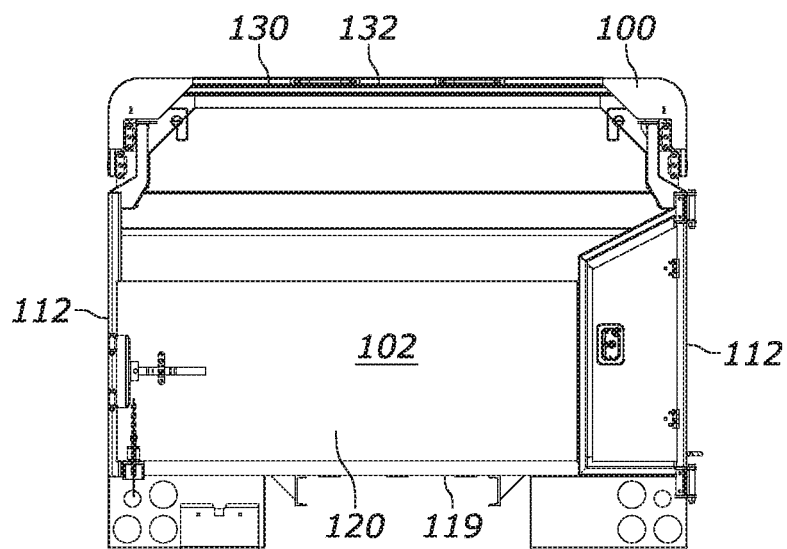
FIG. 20 is a truck body having a fully opened dynamic roof top, illustrating a rear-elevation view thereof.

The dynamic roof top 100 further comprises first and second sub-walls 136 and 138, respectively as illustrated in FIG. 11. The sub-walls 136 and 138 are secured to respective side walls 112 of the truck body. The sub-walls 136 and 138 will support one or more rail systems corresponding to the number of dynamic panels used in the dynamic roof top 100. For example, if there are three dynamic panels, there will be three different rail systems, one for each dynamic panel. One rail system includes a set of tracks, as described below located on both the first and second sub-walls 136, 138, respectively. The dynamic panels span the truck bed 119 and walls 112 contacting only the adjacent panels and its respective rail system.

In the illustrated example embodiment of FIGS. 1-22, the support rail systems 140 and 142 are used for mobilizing the first and second dynamic panels 130 and 132. The rail systems 140 and 142 each comprise first and second rails 146 and 144, respectively located on both sub-walls 136 and 138. In the illustrated example embodiment, the first dynamic panel 130 translates along the first rails 146, which are longer than the second rails 144 because the first dynamic panel 130 travels a longer distance along the sub-walls 136 and 138 than the second dynamic panel 132. Accordingly, the second dynamic panel 132 translates along the second rails 144, which are shorter than the first rails 146 because the second dynamic panel 132 travels a lesser distance along the sub-walls 136 than the first dynamic panel 130.

Figure 2:
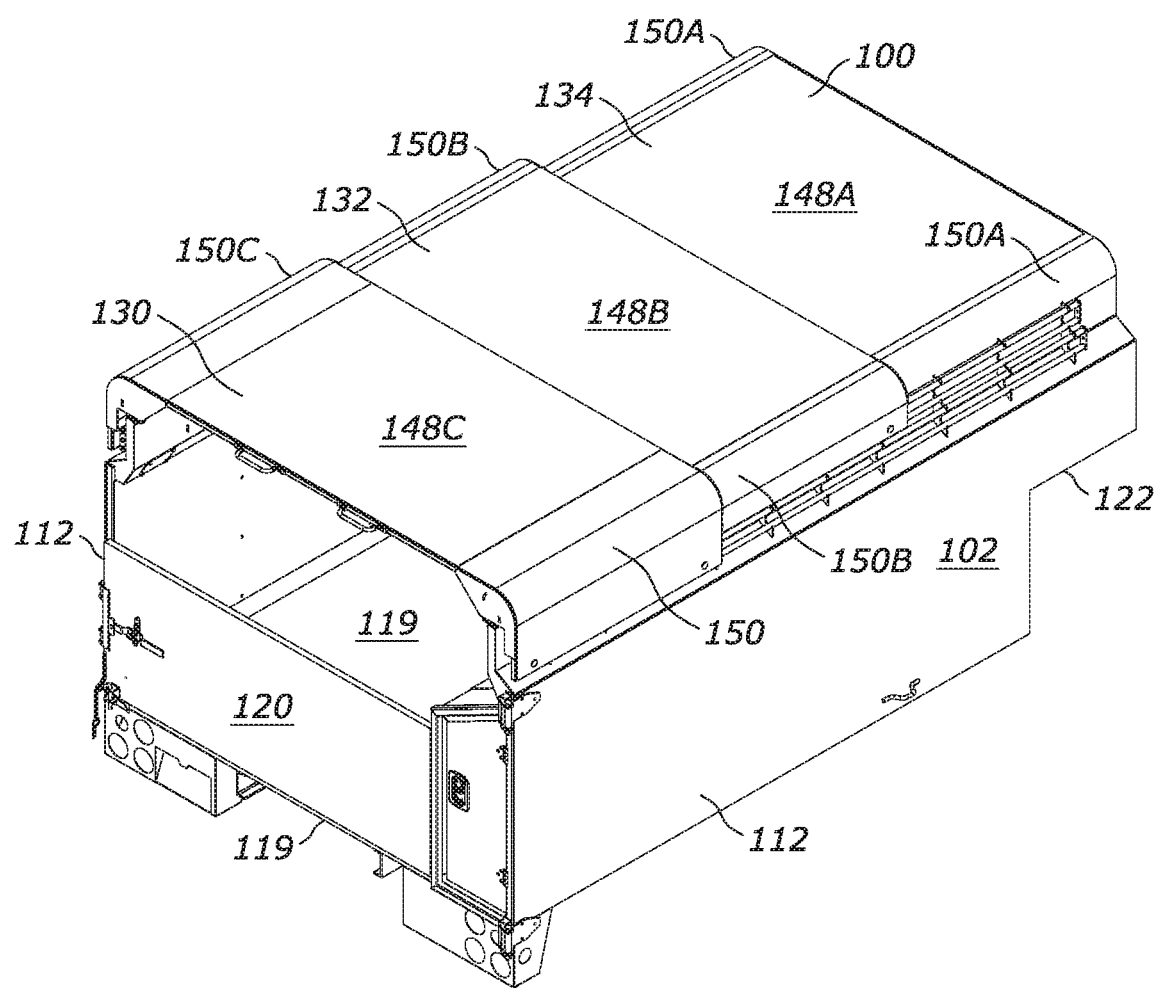
FIG. 2 is a truck body having a fully closed dynamic roof top, illustrating an upper-left perspective view thereof.
Figure 3:
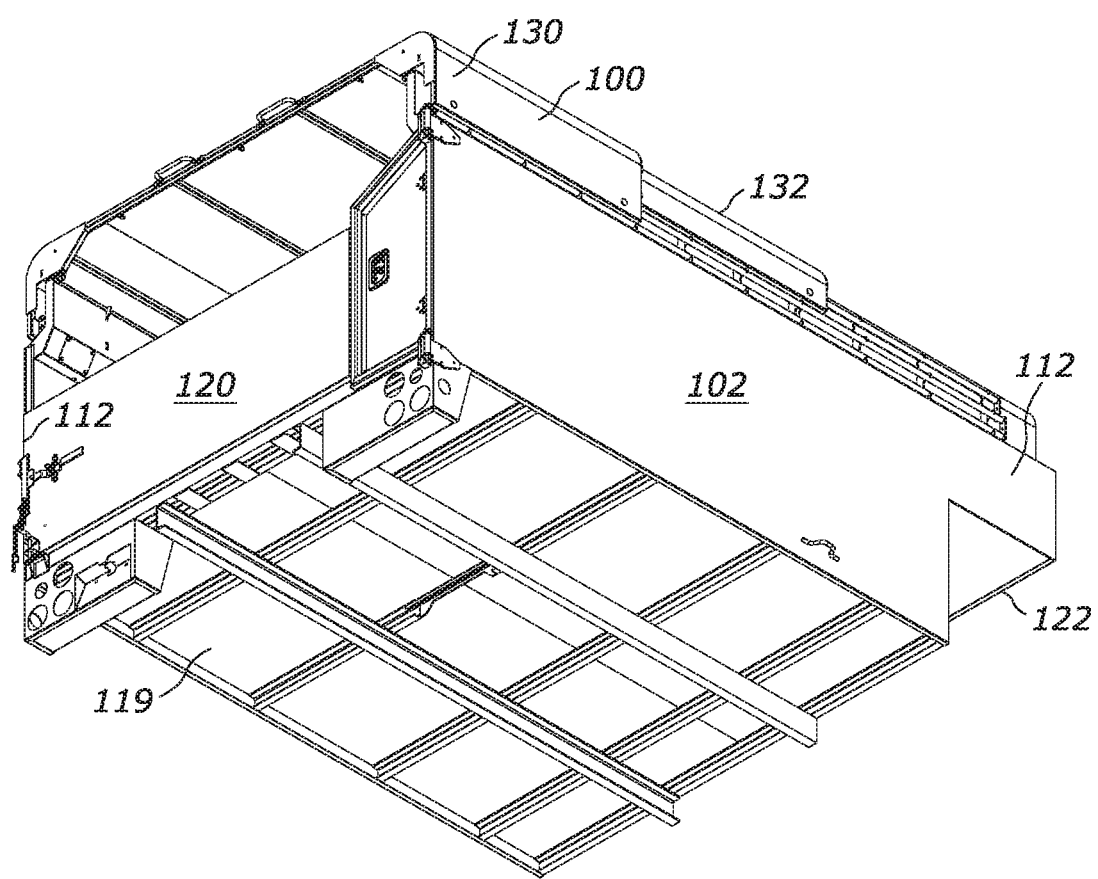
FIG. 3 is a truck body having a fully closed dynamic roof top, illustrating a lower-left perspective view thereof.
Figure 4:
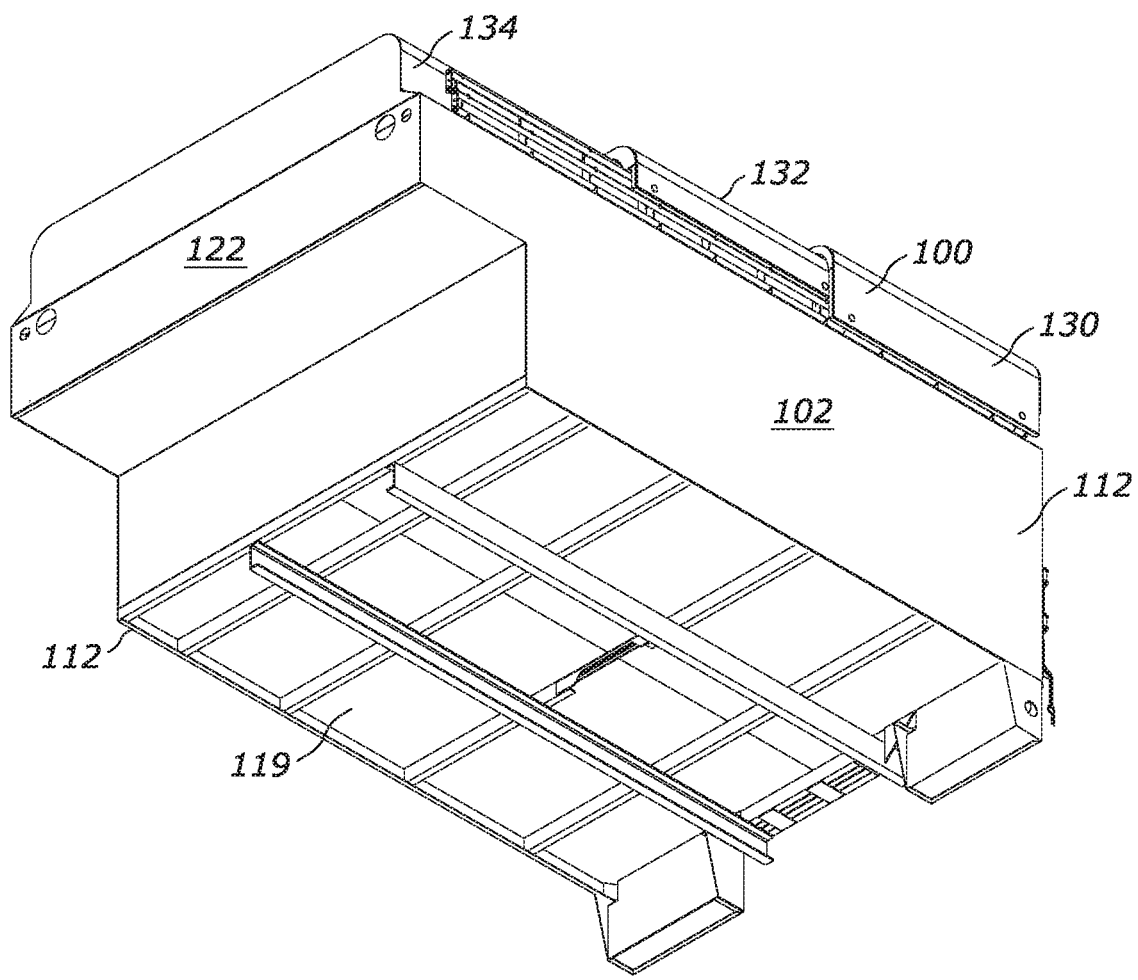
FIG. 4 is a truck body having a fully closed dynamic roof top, illustrating a lower-right perspective view thereof.
Figure 5:
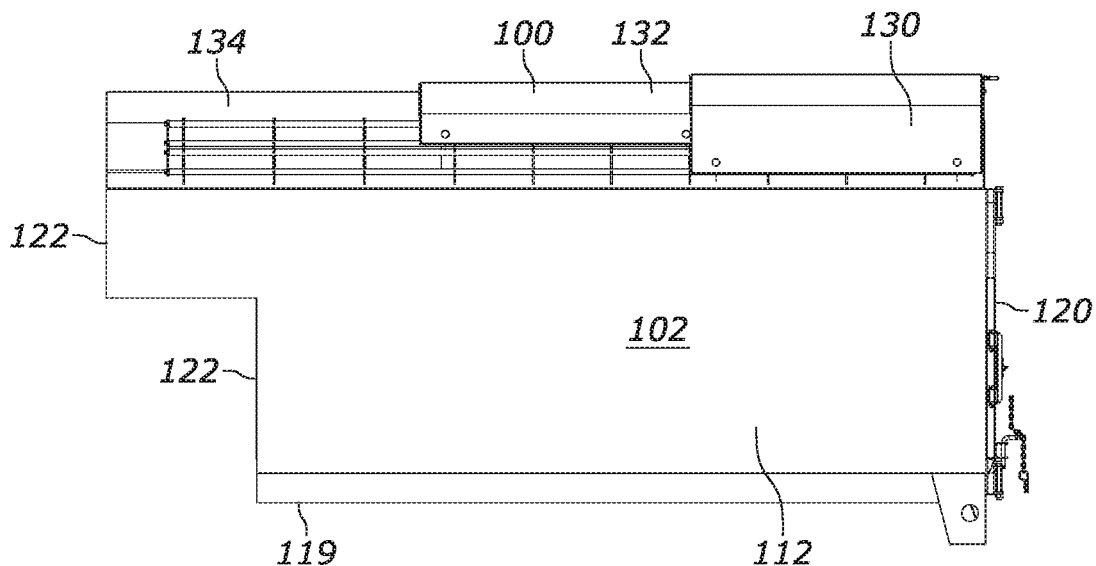
FIG. 5 is a truck body having a fully closed dynamic roof top, illustrating a right-side elevation view thereof.
Figure 6:
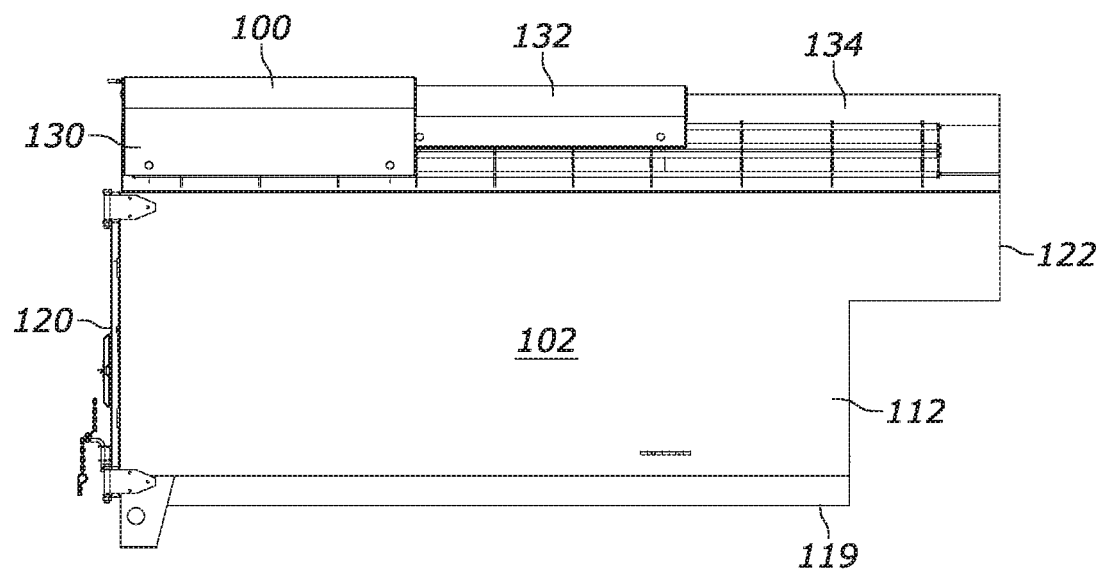
FIG. 6 is a truck body having a fully closed dynamic roof top, illustrating a left-side elevation view thereof.
Figure 7:
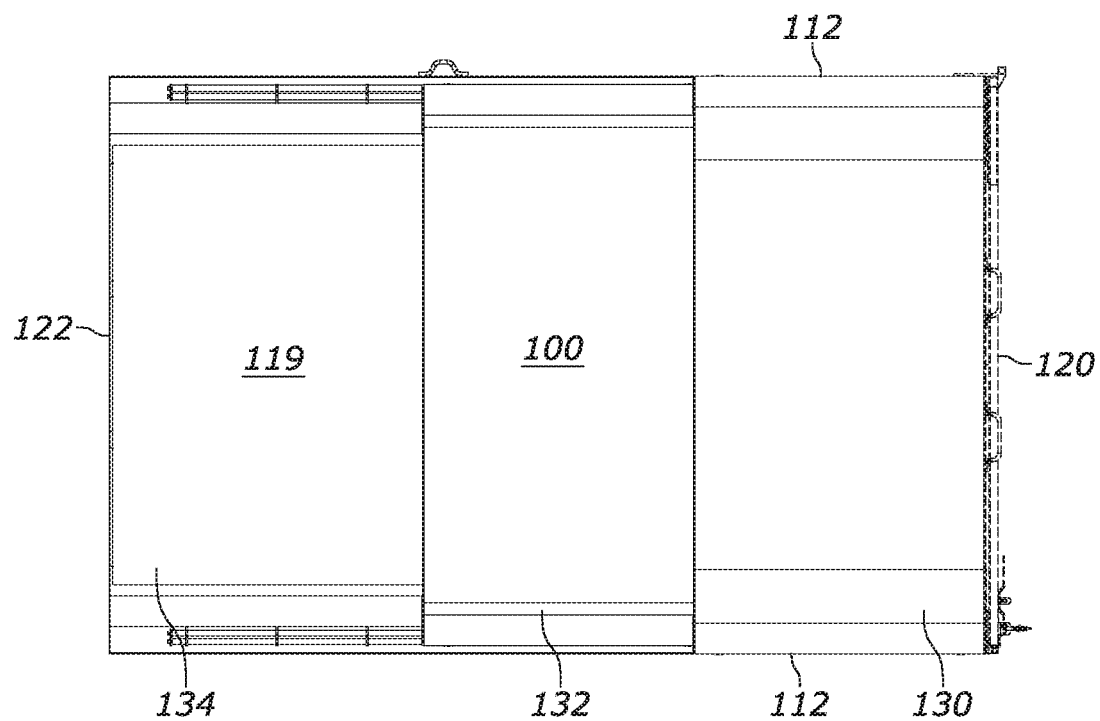
FIG. 7 is a truck body having a fully closed dynamic roof top, illustrating a top-plan view thereof.
Figure 8:
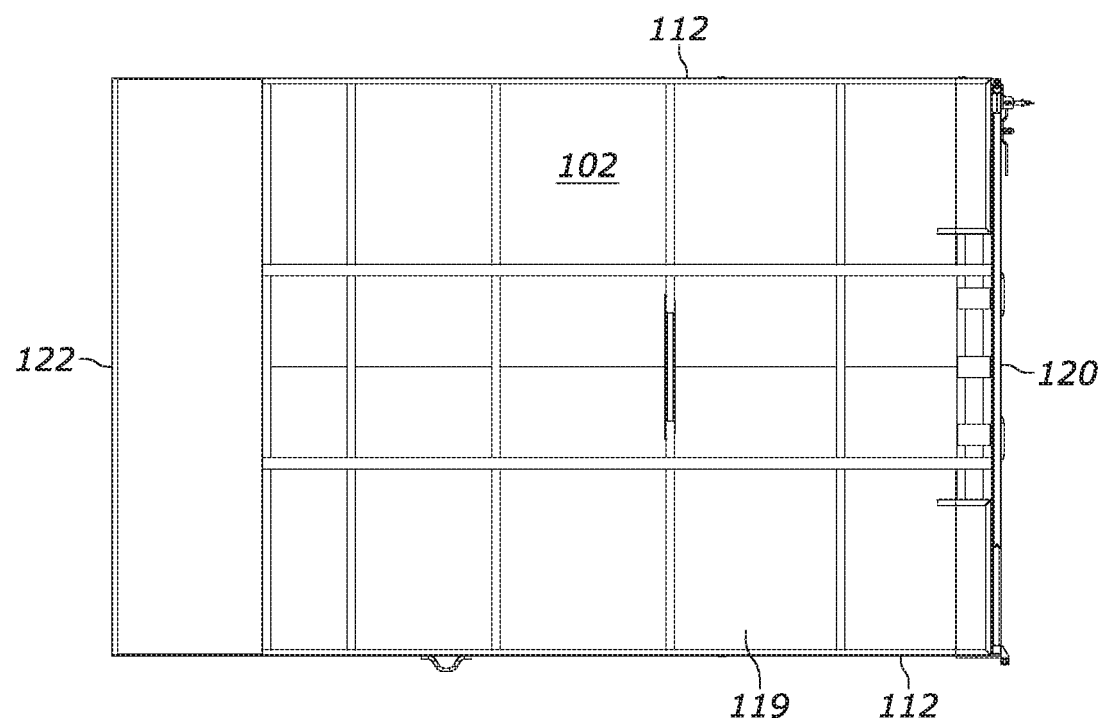
FIG. 8 is a fully closed dynamic roof top, illustrating a bottom-plan view thereof.
Figure 9:
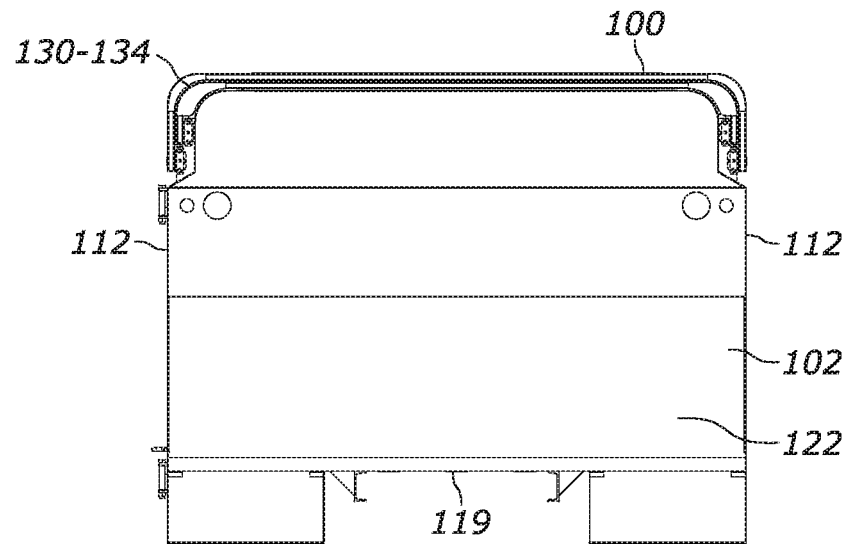
FIG. 9 is a truck body having a fully closed dynamic roof top, illustrating a front-elevation view thereof.
Figure 10:
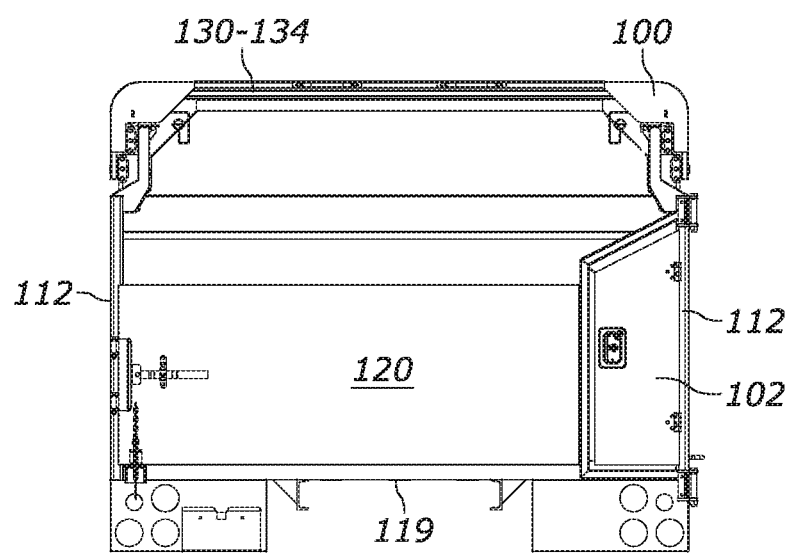
FIG. 10 is a truck body having a fully closed dynamic roof top rear-elevation view thereof.
Figure 21:
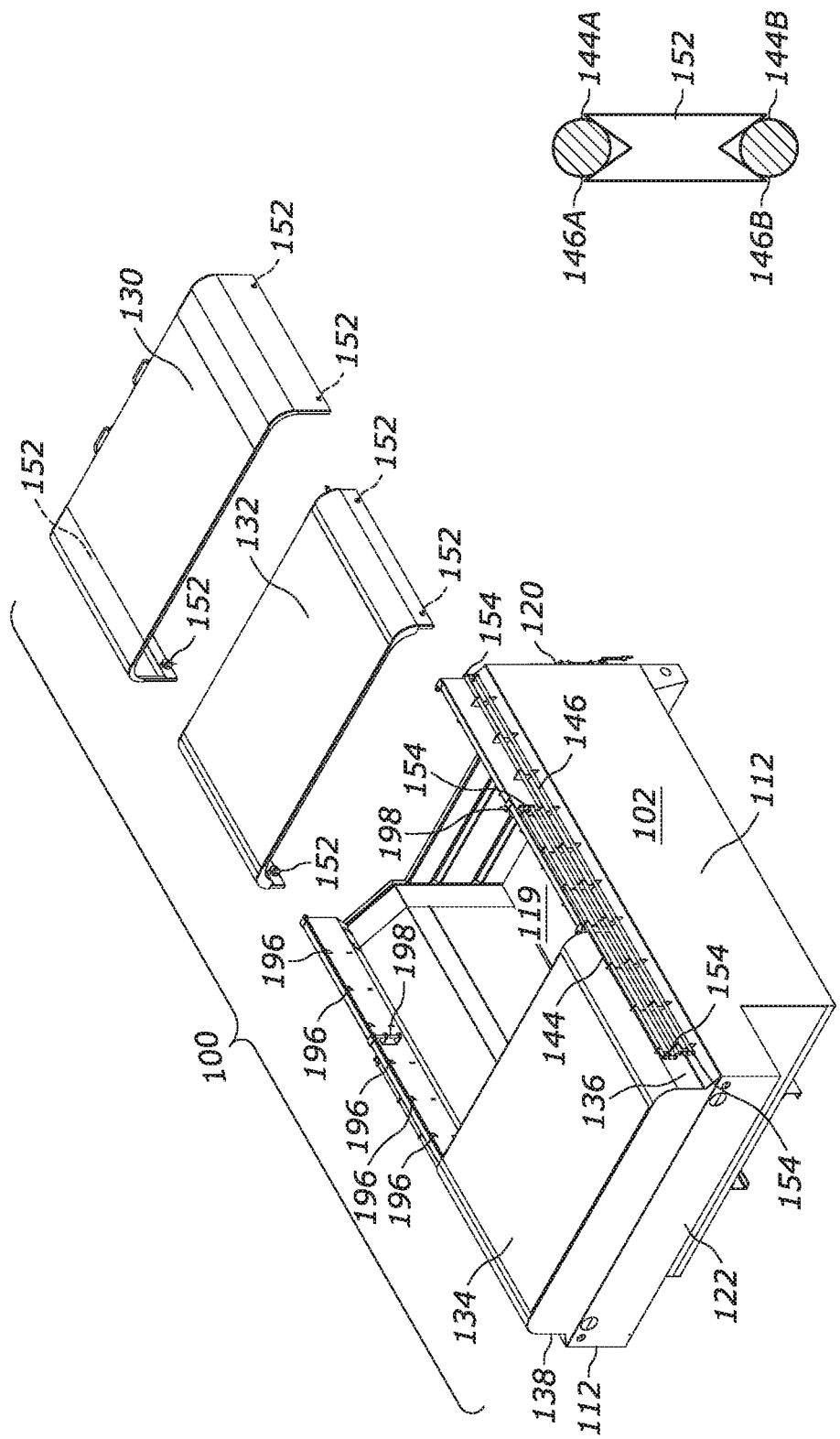
FIG. 21 is a truck body having an upper-right dynamic roof top, illustrating an exploded assembly perspective view thereof.
Figure 22:
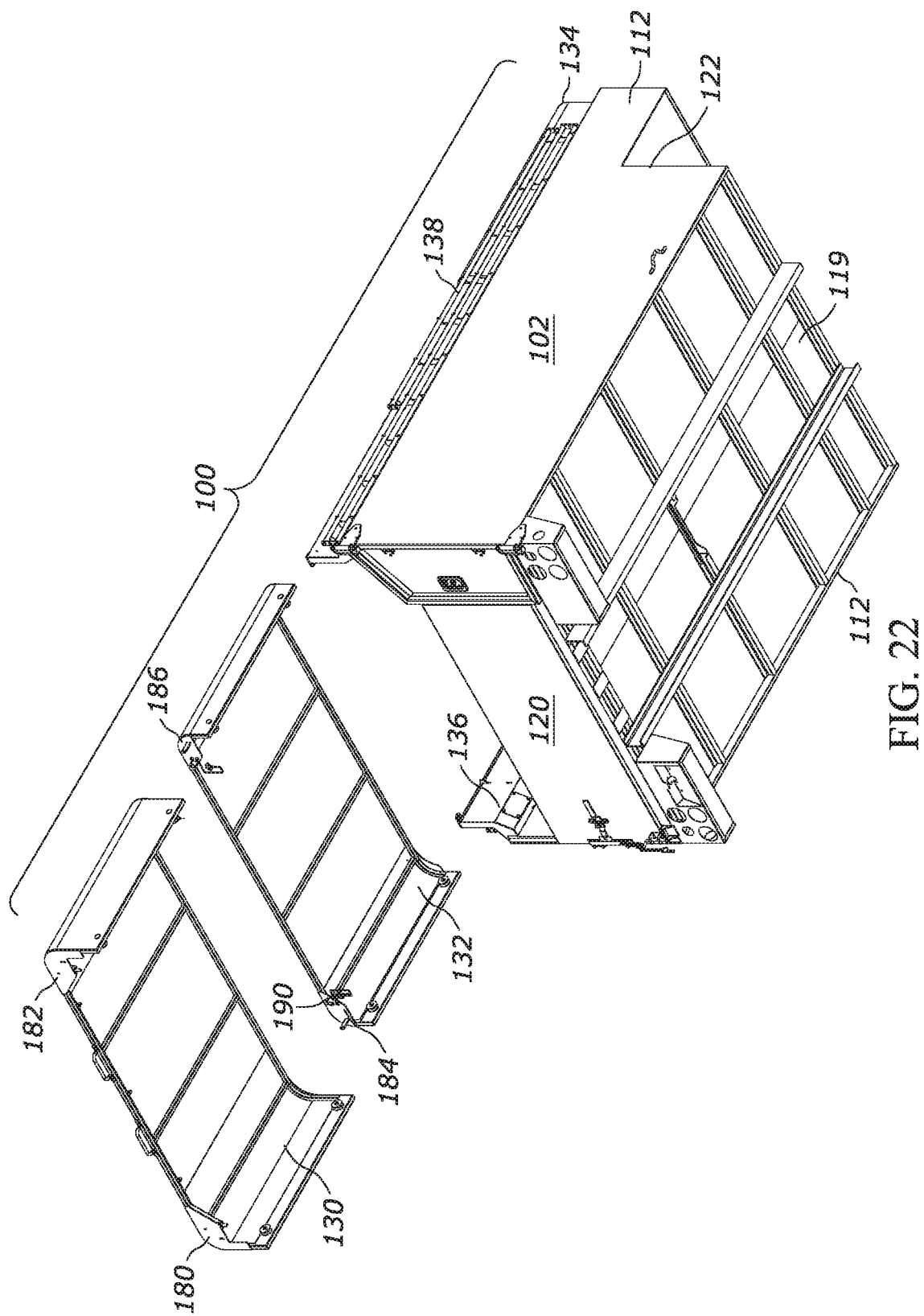
FIG. 22 is a truck body having a dynamic roof top, illustrating a lower-left exploded assembly perspective view thereof.

As illustrated in the example embodiment of FIG. 2, the panels 130, 132, and 134 each include a planar surface 148A-148C spaced by arcuate ends 150A-150C. Positioned internally on both dynamic panels 130 and 132 are a plurality of wheels, rollers, bearing, and the like 152 (hereinafter "wheels") anchored by an axle to the walls of the arcuate ends 150. In the illustrated example embodiment, the wheels 152 include a V-groove for rotable-translatable encapsulation respectively between upper rail 146A and 144A of first and second rails and lower rail 146B and 144B of first and second rails, as illustrated in FIGS. 21 and 21A. Stops 154 are fasted to and located at the ends of the rails 144, 146. One of the stops 154 on each of the rails must be removed (typically by tools or clevis pins) in order for the wheels 152 and in particular the v-groove to be positioned (and locked allowing only for rotation) between the upper and lower rails 144A, 144B and 146A and 146B, respectively.

As can be seen in the opening and closing FIGS. 24-42, the dynamic panels 130 and 132 move transversely to the rail systems 140 and 142, but parallel from each panel's front to the back such that the wheels 152 are spaced at a great enough distance to prevent any racking along the rail system. The rail systems 140 and 142 are further aligned such that the panels 130 and 132 remain parallel with each other and maintain a constant spacing throughout the dynamic panels entire path of travel.

Once the wheels 152 are positioned between the upper and lower rails 144 and 146, they cannot be removed from the track unless a stop 154 is removed (as the distance between the rails is less than the outer wall or diameter of the v-groove in the wheels 152). Thus, as the wheels 152 translate along the rail systems 140 and 142, the dynamic panels 130 and 132 to which they are attached also translate along the rails as illustrated in the time lapse in the direction of the arrows in FIGS. 24-42. That is, FIGS. 24-34 are upper-right perspective views illustrating a truck body's opening and closing motions of a dynamic roof top 100 in accordance with one example embodiment of the present disclosure and FIGS. 35-42 are upper-left perspective views illustrating a truck body's opening and closing motions of a dynamic roof top 100 in accordance with another example embodiment of the present disclosure.

The sub-walls 136 and 138 are fastened to the sidewalls 112 by fasteners passing through abutting flanges from the side walls and sub-walls. Alternatively, the sub-walls 136, 138 are welded to the side walls 112, or use a combination of welding and fasteners for their respective attachment. Unless otherwise specified, the materials used to form the dynamic root top 100 is metal such as steel or aluminum, but it should be appreciated that other types of materials are contemplated of similar strength and weight, such as a rigid polymer.

Illustrated in FIGS. 11-20; 24-29; and 35-38 in which the dynamic panels 130 and 132 are in the retracted or open position. The dynamic panels 130 and 132 are configured such that the rail systems 140 and 142 provide sufficient clearance to the dynamic panels to allow the second dynamic panel 132 to pass over without interference i.e. envelop static panel 134. And, the rail systems 140 and 142 provide sufficient clearance to the dynamic panels to allow the first dynamic panel 130 to pass over without interference i.e. envelop the second dynamic panel 132.

This enveloping design of the three panels allows for a significant amount of access to put contents into the bed 119 (as shown by arrow D in FIG. 11), advantageously without removing the panels 130, 132, and 134 required by conventional trucks. For example, a mulching or chipper receiving tree branches can align its shoot into the opening 170 (see FIG. 11) provided by the retracted interlocking panels 130 and 132 as they envelope each other and the static panel 134 such that the contents land on the truck bed 119. Equally advantageous is after the filling of the truck bed 119, the dynamic panels can be closed or retracted as illustrated in FIGS. 1-7; 30-34; and 39-42. While yet another advantage of the illustrated sliding or dynamic roof top 100 design is side load (i.e. 90 degrees to the direction of the truck) with material such as mulch, other landscaping materials, and even large trees. Such design further allows the dynamic roof top 100 to close after the bed is loaded unlike conventional truck tops.

The v-groove wheels 152 travel along the rail systems 140, 142 without interfering with support clips 172 (see FIG. 11) that are attached to the sub-walls 136 and 138. The support clips 172 are c-shaped so as not to obstruct the path of travel of the wheels 152 as they translate along the rails, in which the top of the "c" is attached the upper rail and the bottom of the "c" is attached to the bottom rail. In the illustrated example embodiment, the support clips 172 are welded to the upper rails, lower rails, and sub-walls 136, 138. While other attachments means are contemplated without departing from the spirit and scope of the present disclosure.

The rail systems 140 and 142 maintain the clearance heights between the static panel 134, the second dynamic panel 132, and the first dynamic panel. The dynamic panels 130 and 132 are light enough that a single operator can manually retract and extend the dynamic panels with little effort. The operator during the retracting or extending of the dynamic panels can use handles 172 and 174 (see FIG. 11) attached to the first dynamic panel 130.

Figure 30:
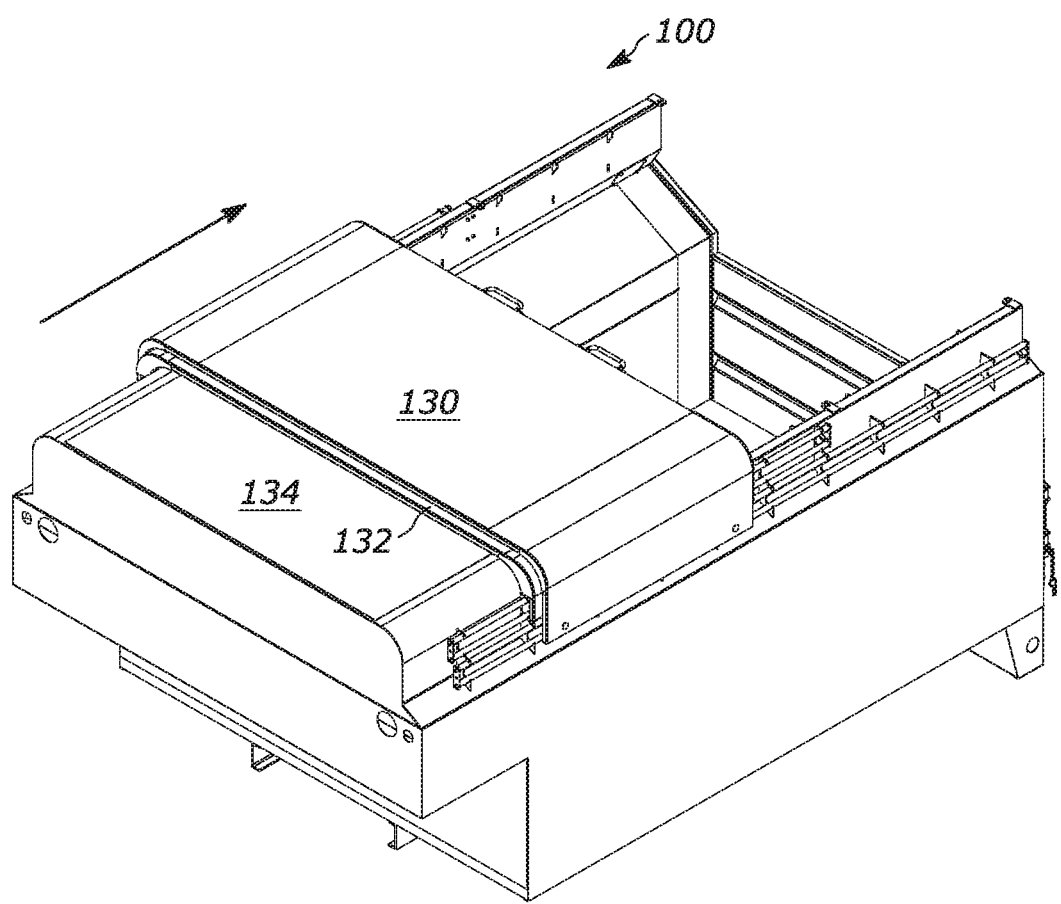
Figure 31:
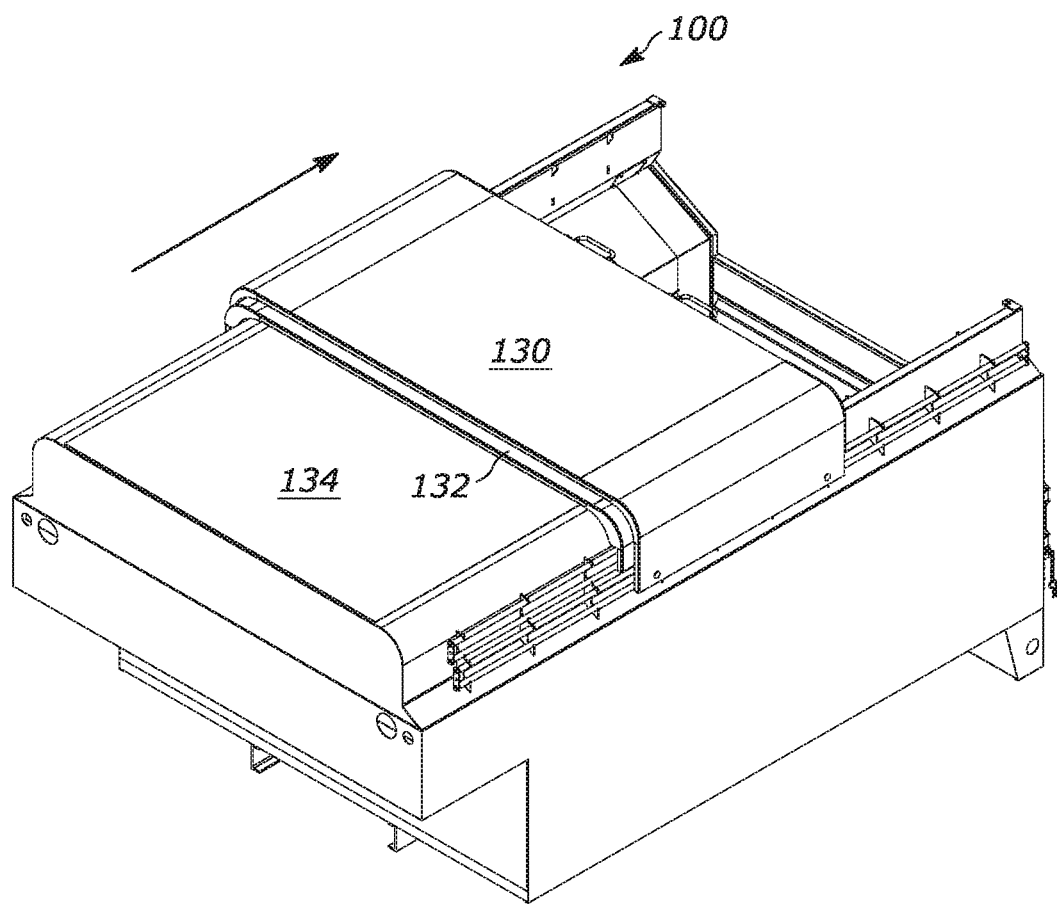
Figure 32:
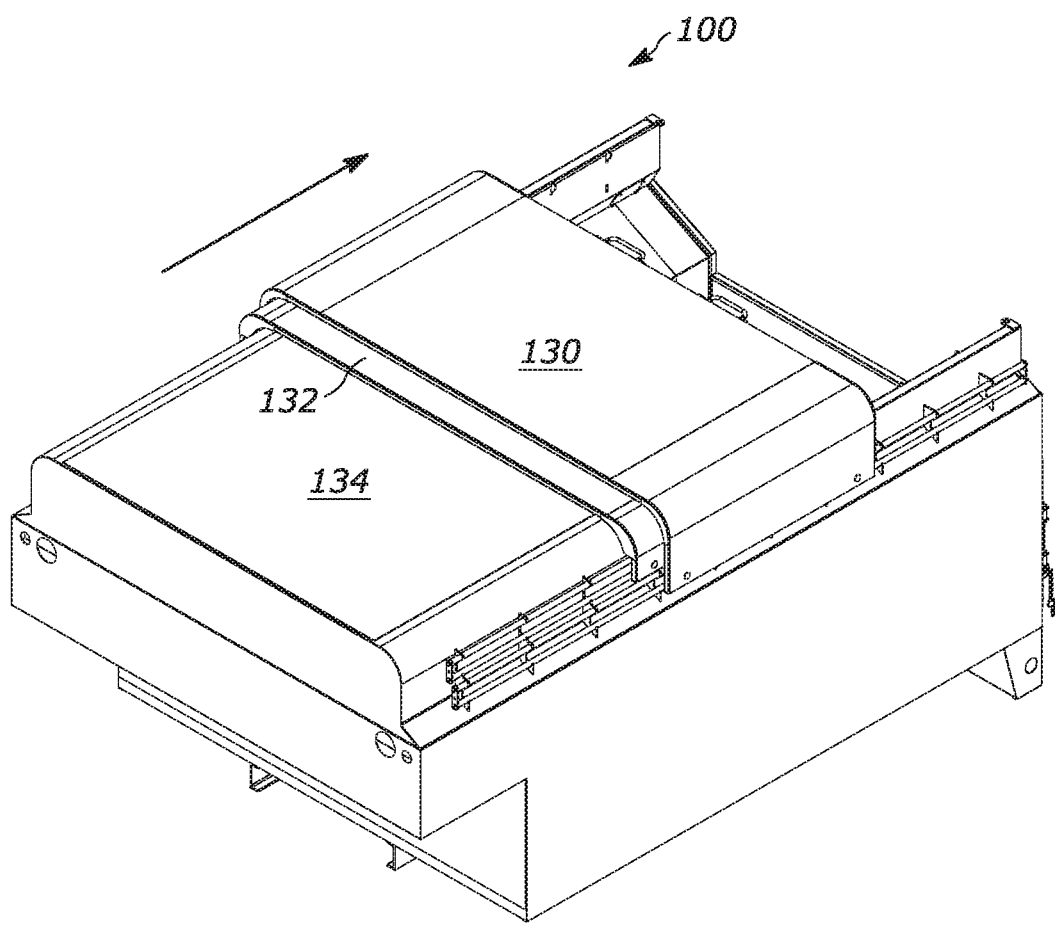
Figure 33:
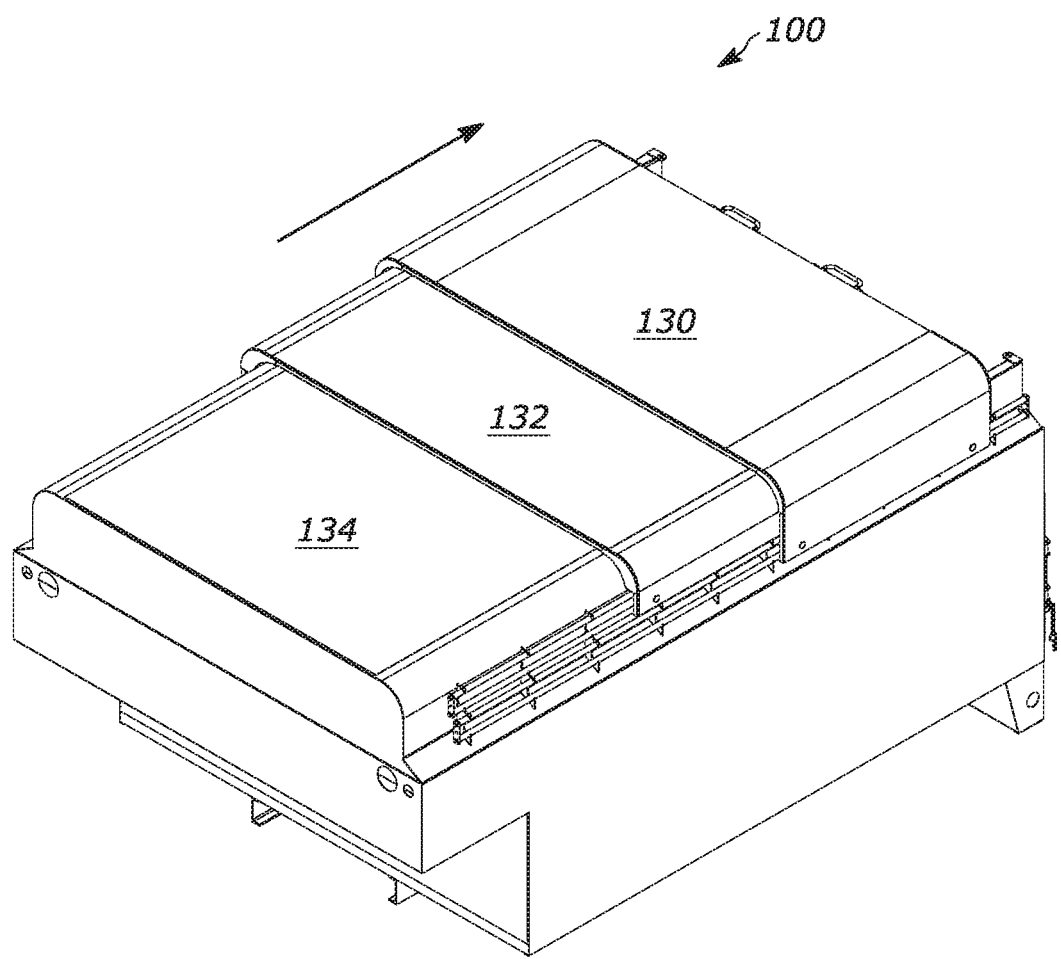
Figure 34:
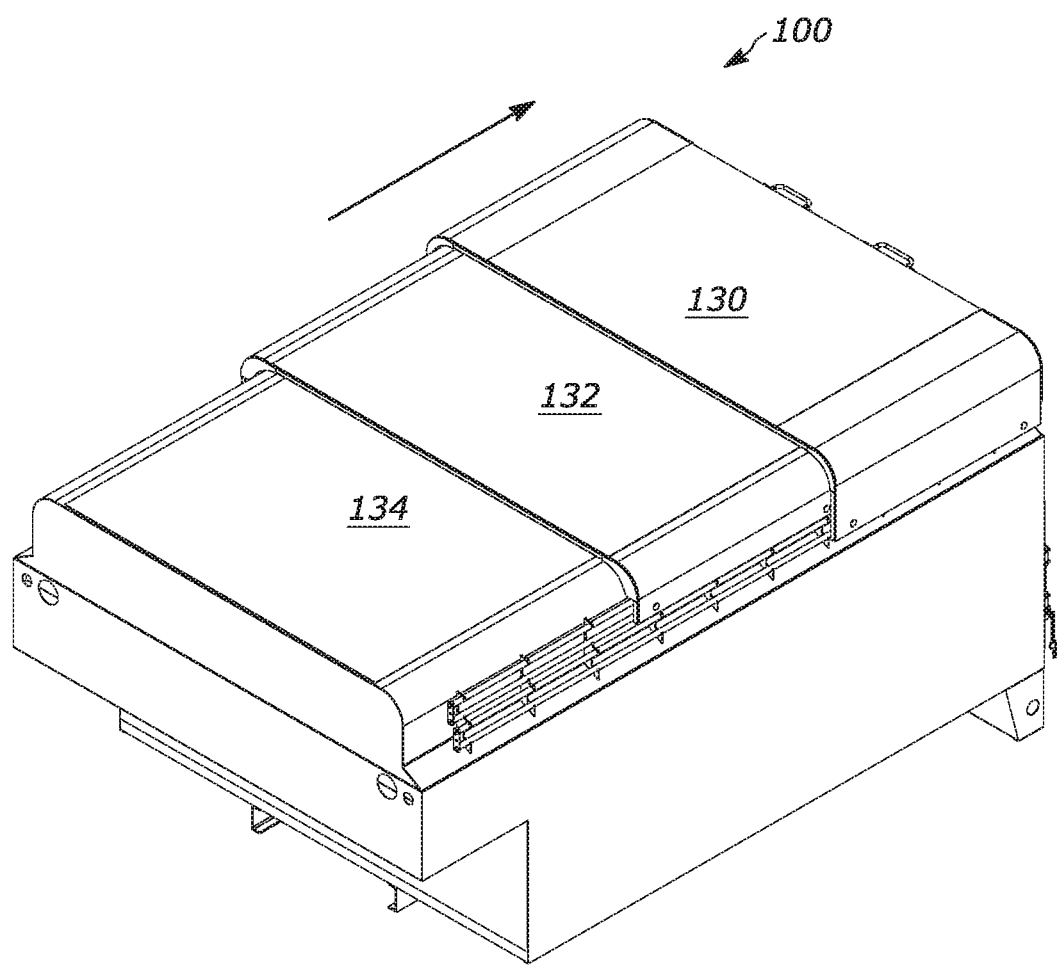
Figure 35:
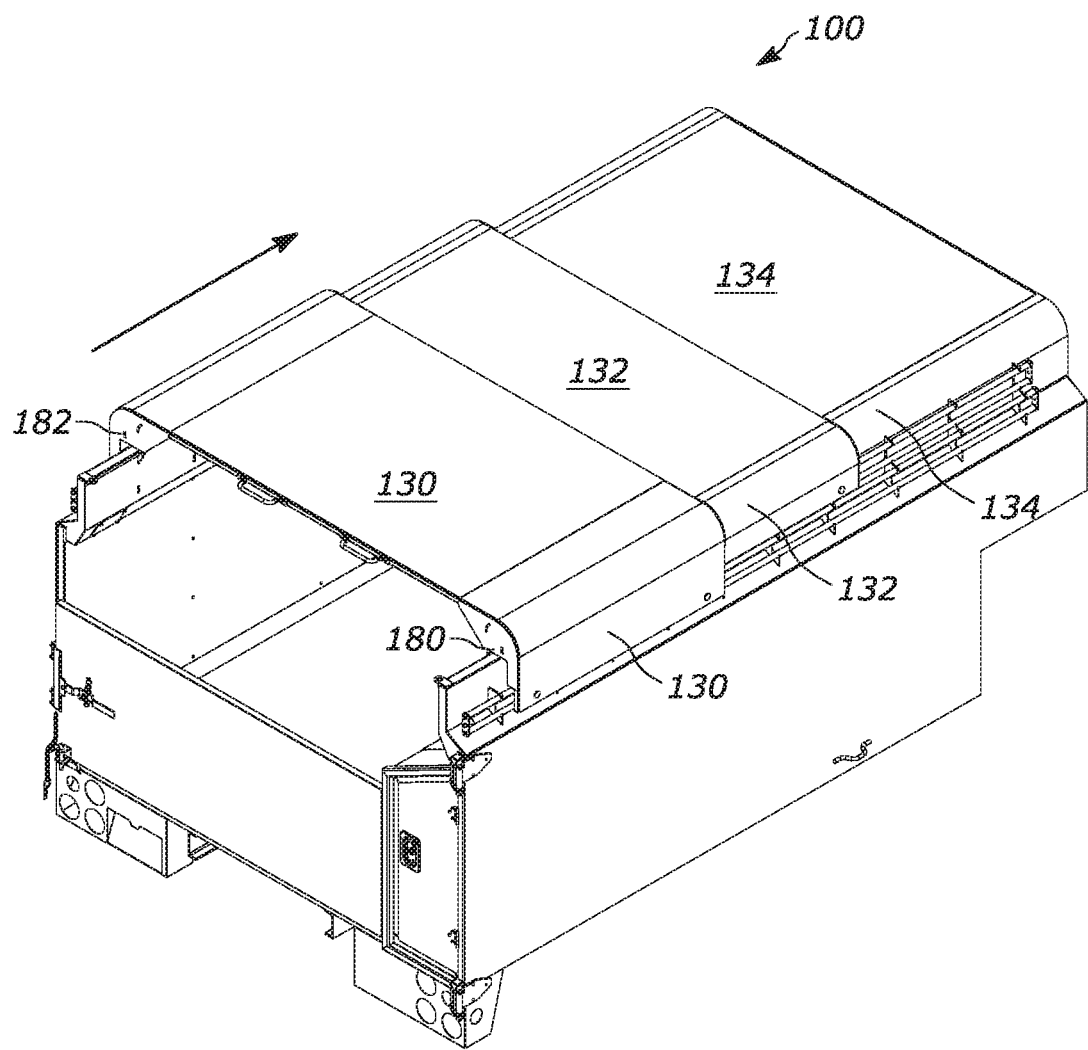
FIGS. 35-42 are upper-left perspective views illustrating a truck body opening and closing motions of a dynamic roof top in accordance with another example embodiment of the present disclosure.
Figure 36:
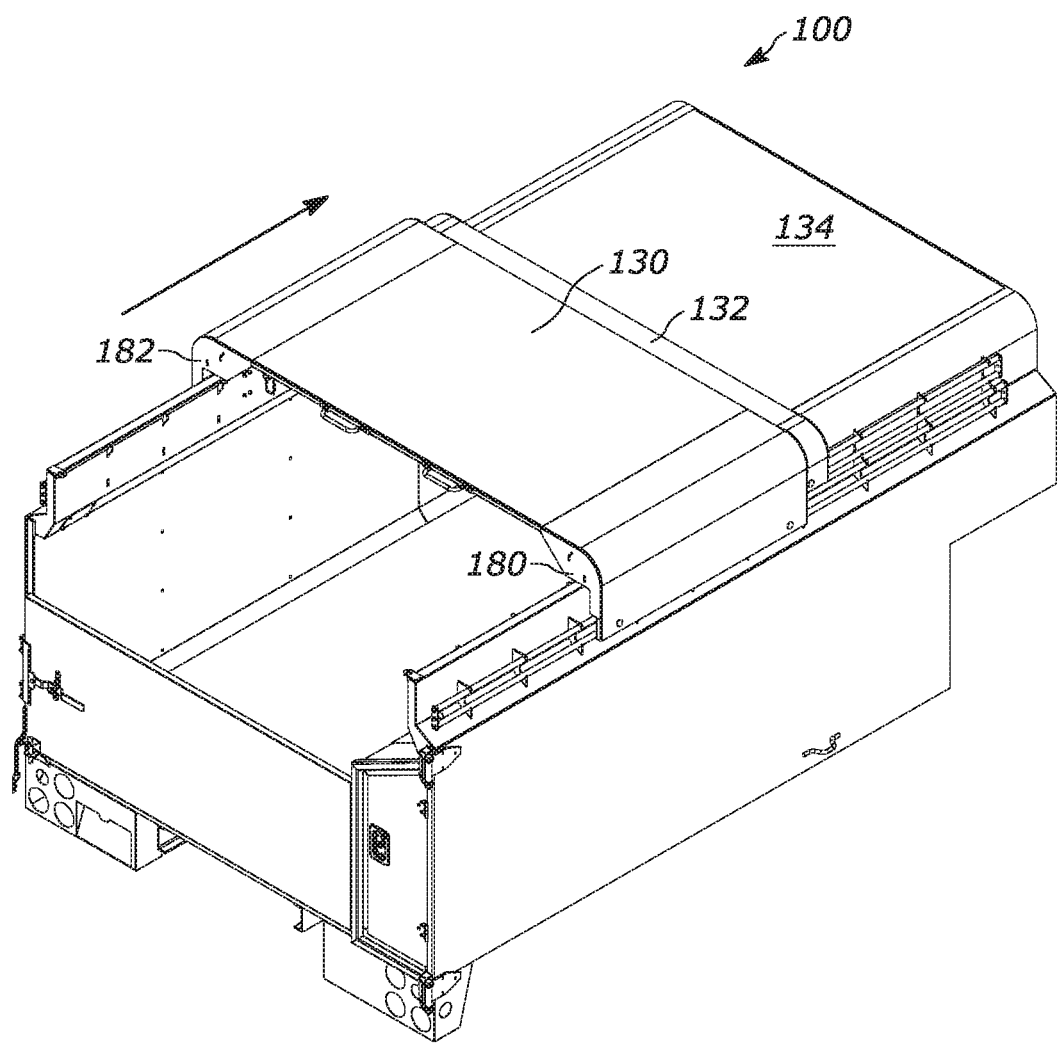
Figure 37:
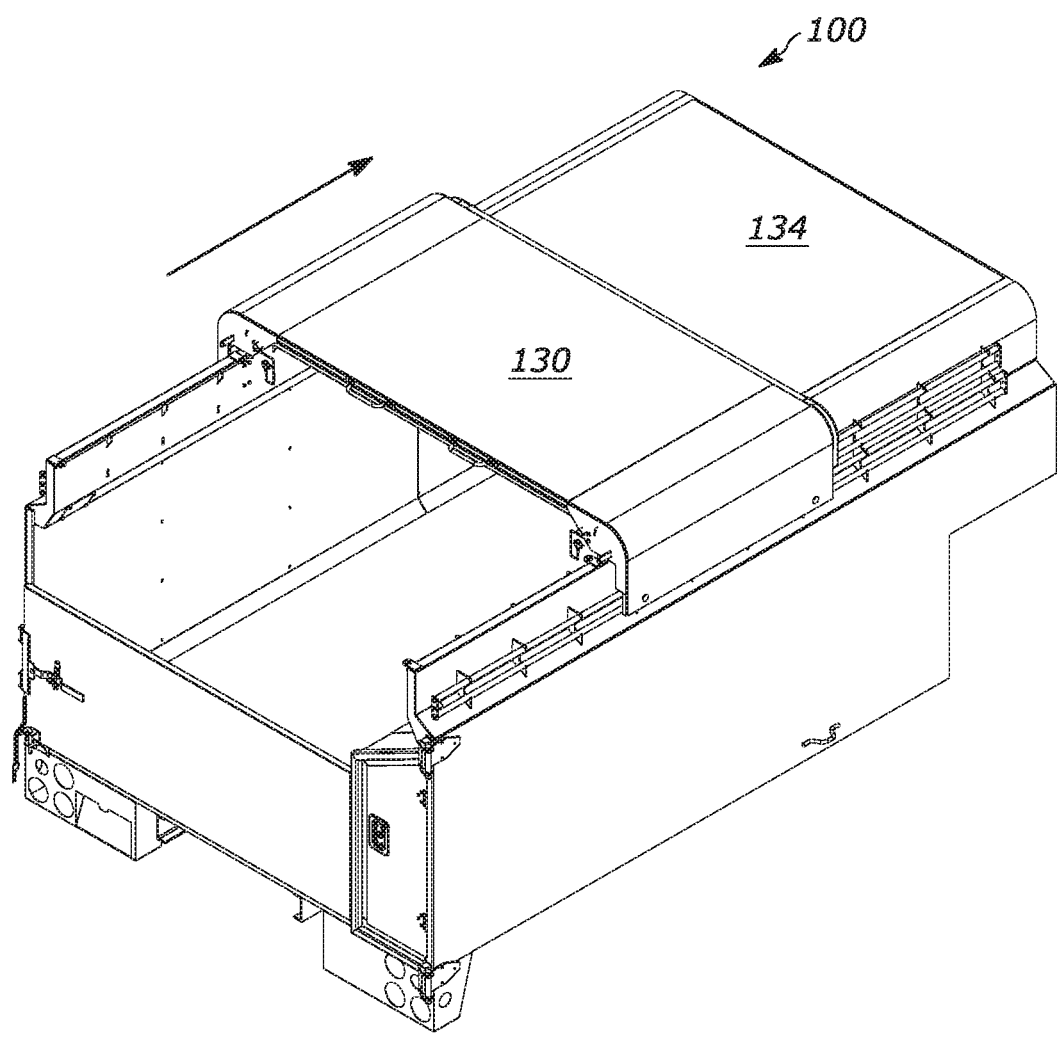
Figure 38:
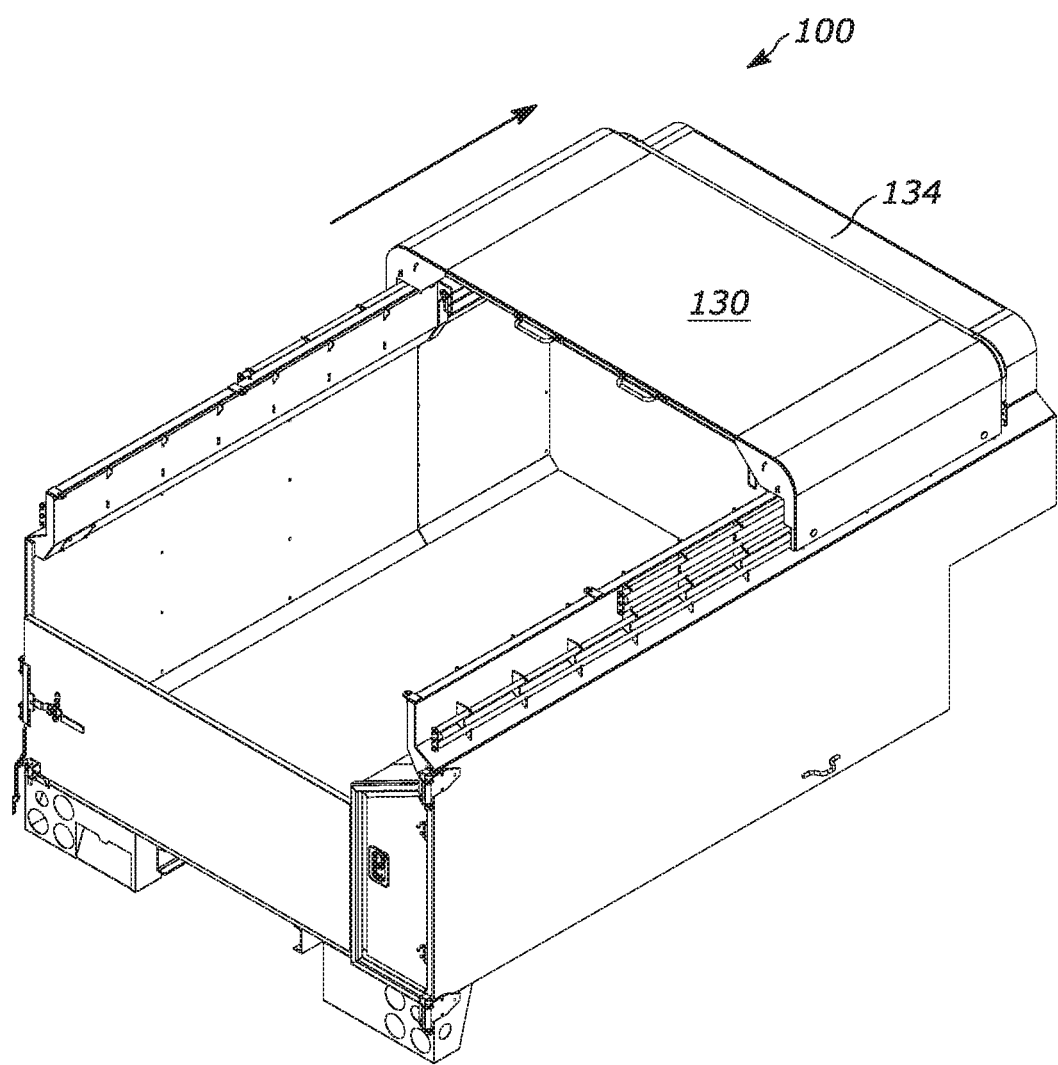
Figure 39:
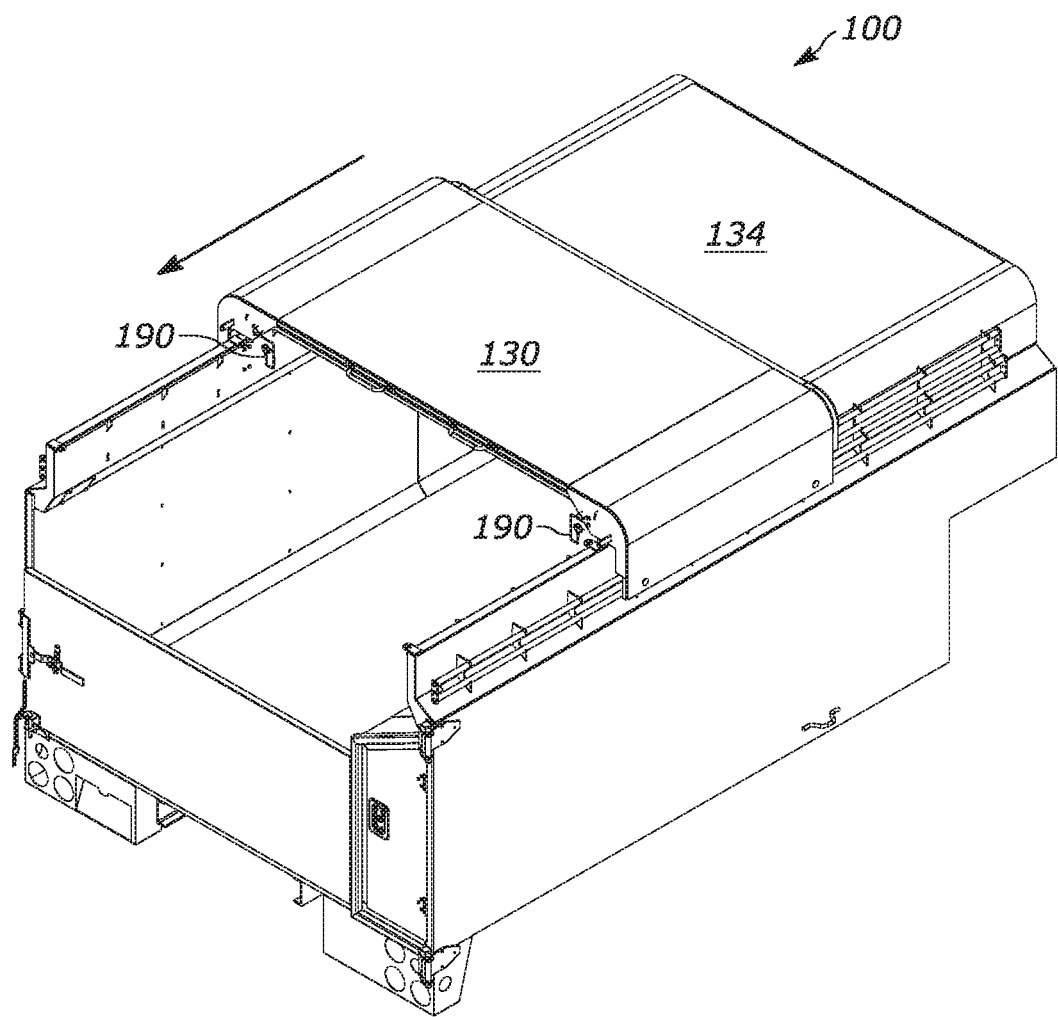
Figure 40:
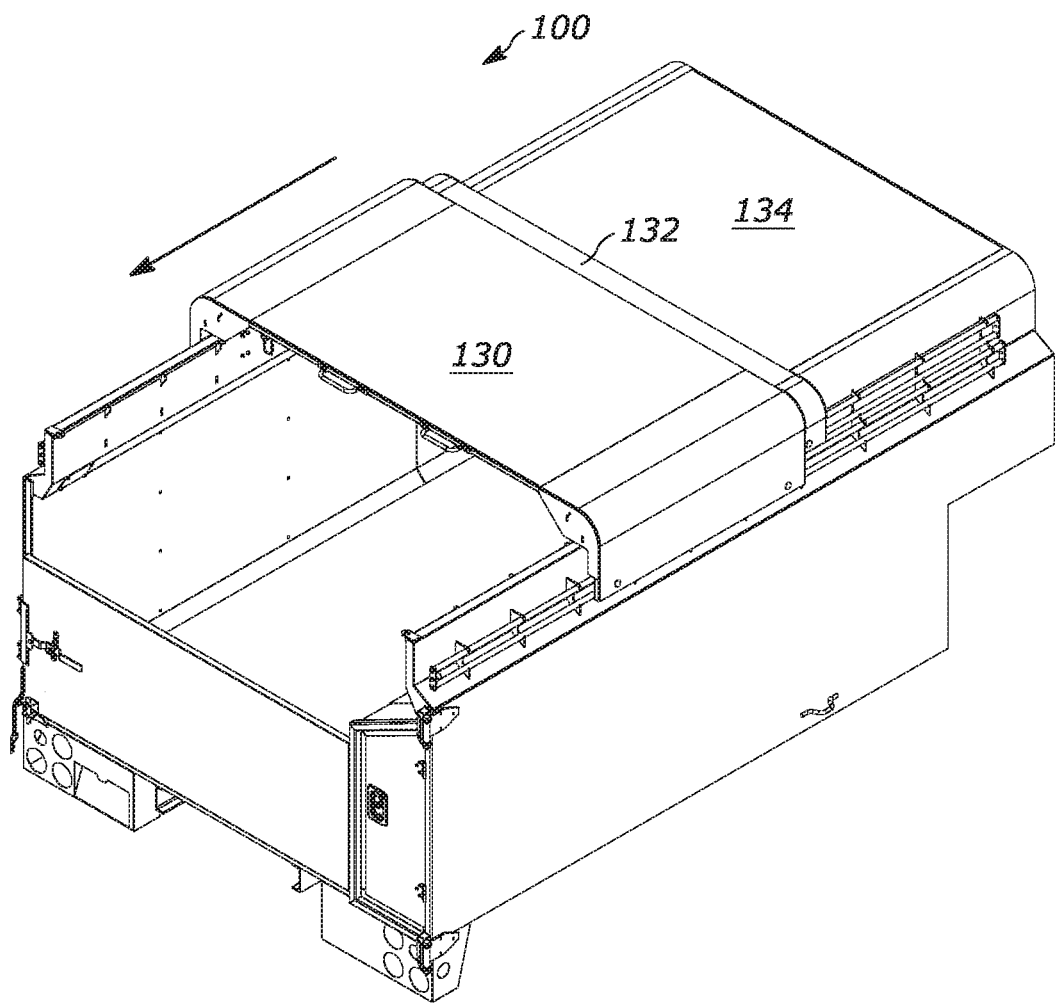
Figure 41:
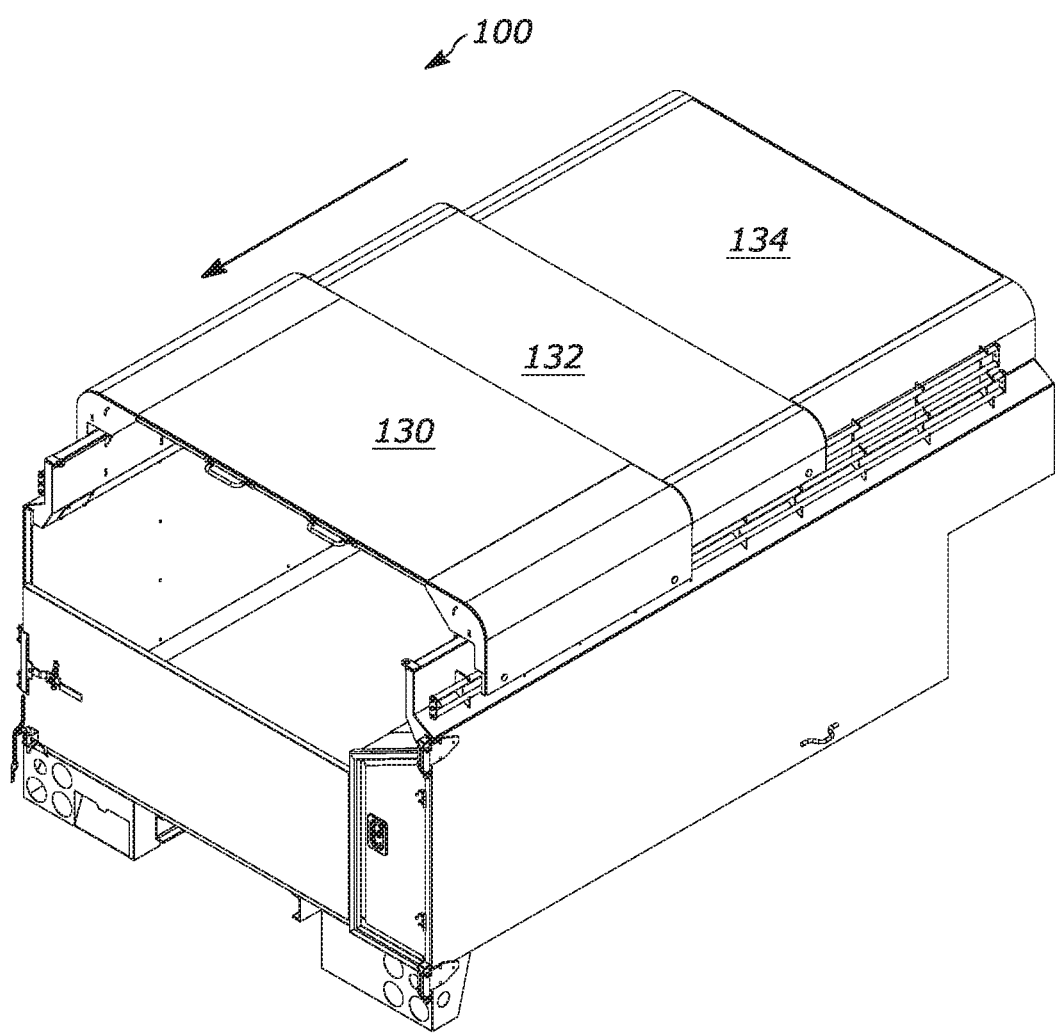
Figure 42:
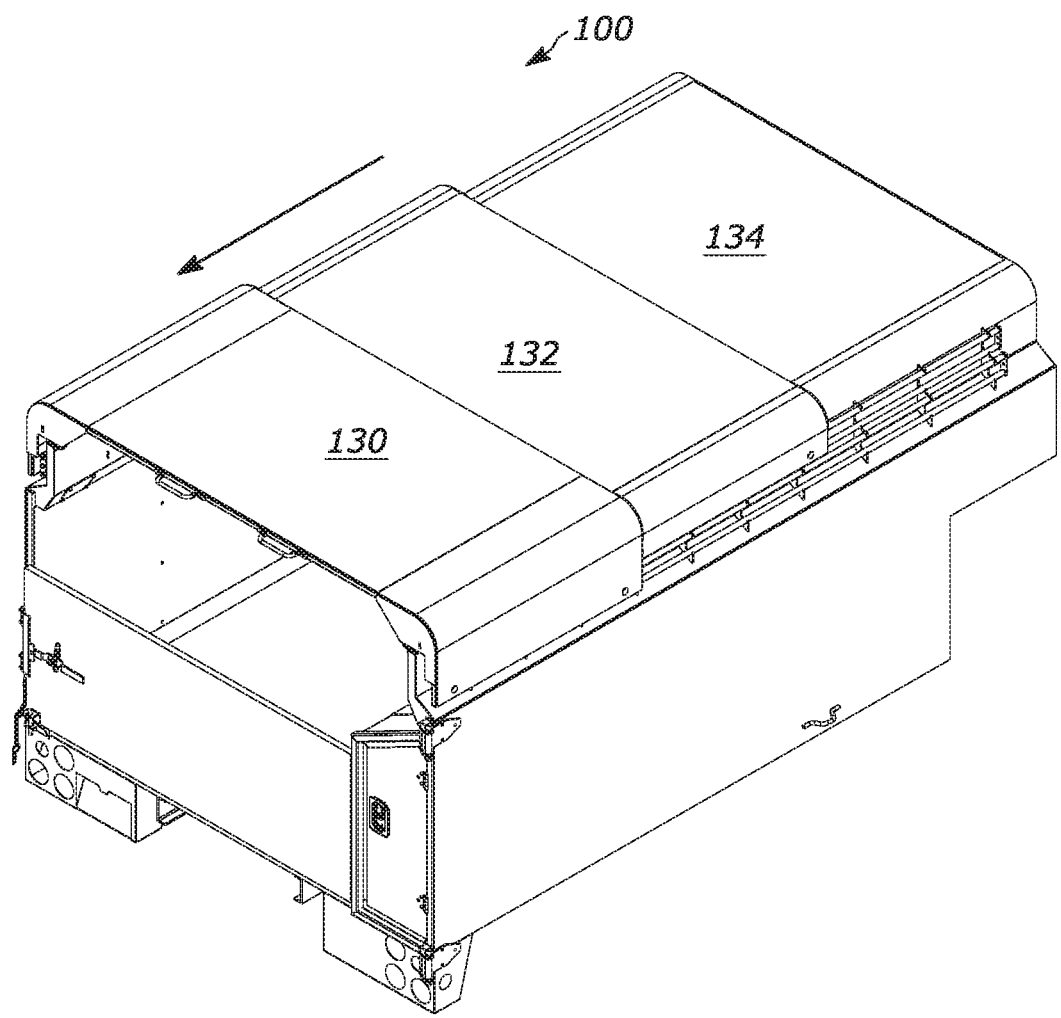
Figure 43:
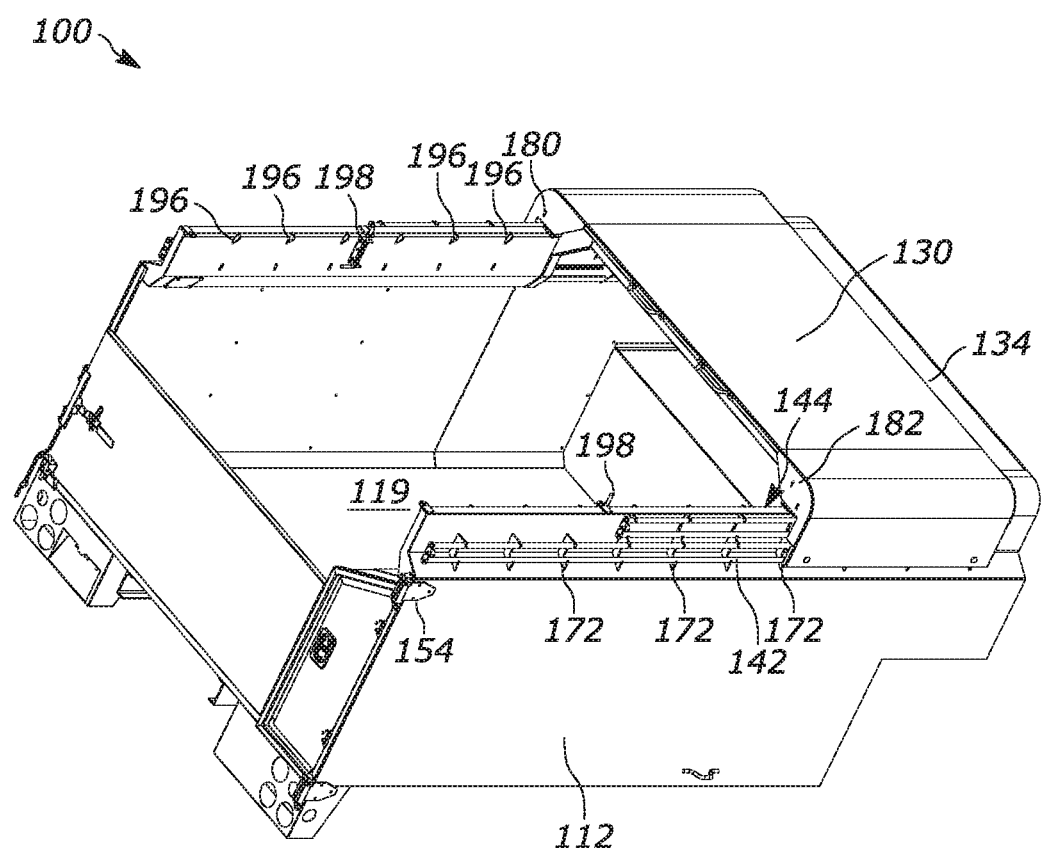
FIG. 43 is partial isometric view illustrating a truck body having a dynamic roof top constructed in accordance with another example embodiment of the present disclosure.

In one example embodiment, the first dynamic panel 130 is advanced to a retracted position by an operator (see FIGS. 25 and 35) toward the static panel 134. Gussets 180 and 182 (see FIGS. 22 and 35) are located on the rear of the first panel 130 such that once the first panel reaches the second panel 132, the gussets engage contact plates 184 and 186, causing the translation of the first panel toward the static panel 134 to also cause translation in the second panel 132 once contact is made (see FIG. 35). The contact of the gussets and contact plates force the movement of the second panel 132 by and through the first panel 130 until gussets engage contact plates in the static panel 134. In an alternative example embodiment, the wheels 152 engage the stops 154 to prevent further travel of first and second panels 130, 132, respectively Upon engagement of the gussets 180 and 182 with contact plates 184 and 186, a spring-loaded catch 190 (see FIG. 22) couples the first dynamic panel 130 with the second dynamic panel (at contact point illustrated in FIGS. 26 and 36). The spring loaded catch 190 maintains a coupled connection between the first and second panels 130 and 132 as the panels translate into a retracted or closed position as illustrated in FIGS. 30 and 39. Upon reaching the de-contact point (see FIGS. 31 and 40), the spring-loaded catch 190 is removed, decoupling the first and second panels so that the first panel continues along rail 146 and the second panel's travel terminates upon engaging the stop 154 on rail 144. In an alternative example embodiment, the spring-loaded catch 190 is replaced with a locking clevis pin that manually locks and unlocks the panels to allow or prevent movement by a user.

In one example embodiment, the translation of the first dynamic panel 130 and second dynamic panel can be controlled by a series of stops 196 (see FIG. 21) located on one or both of the sub-walls 136 and 138 in which a spring-loaded pin can be activated under the arcuate portion 150 of the panels to prevent complete movement if the truck were to move as a safety device. In another example embodiment, a locking pin 198 is used on one or both sub-walls 136 and 138 to lock the second panel 132, the first panel 130, or both panels into position to prevent front-to-back movement, for example during transport until the pin is pulled down against the spring force to remove the pin from a corresponding aperture in one or both panels.

Figure 23:
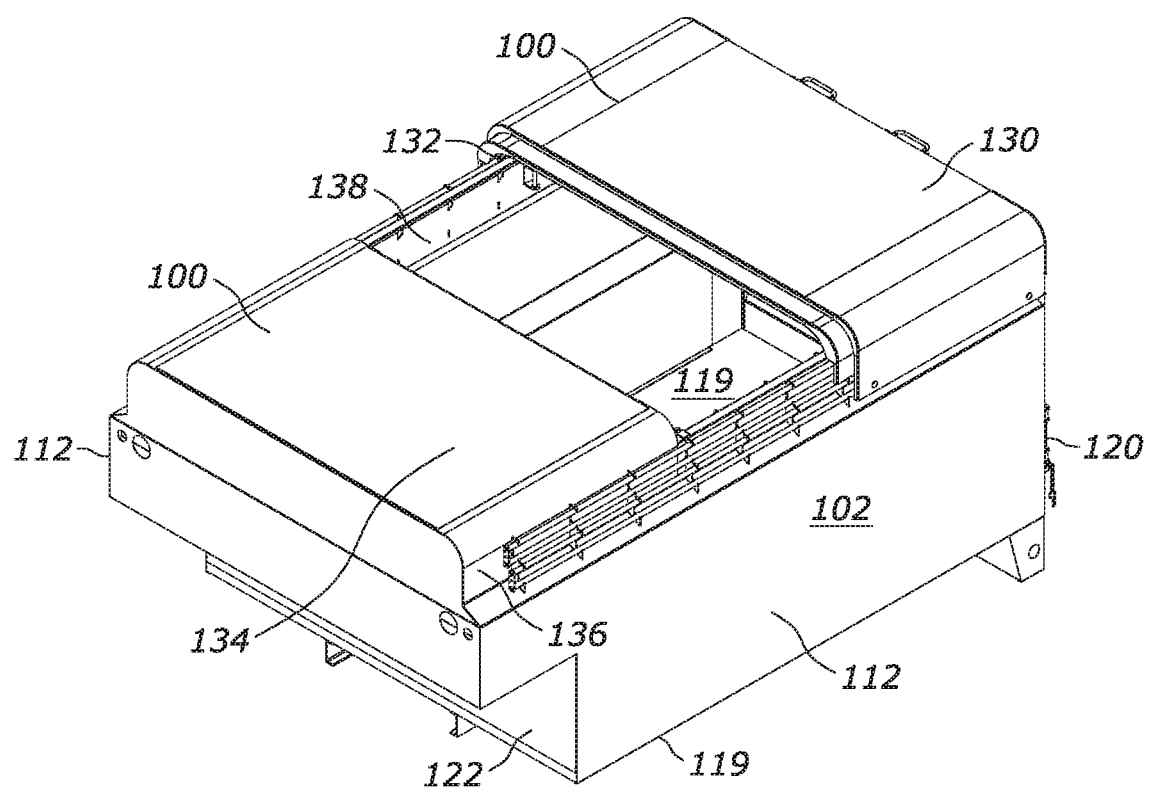
FIG. 23 is a truck body having one of a partially opened and a partially closed dynamic roof top, illustrating an upper-right perspective view constructed in accordance with another example embodiment.
Figure 24:
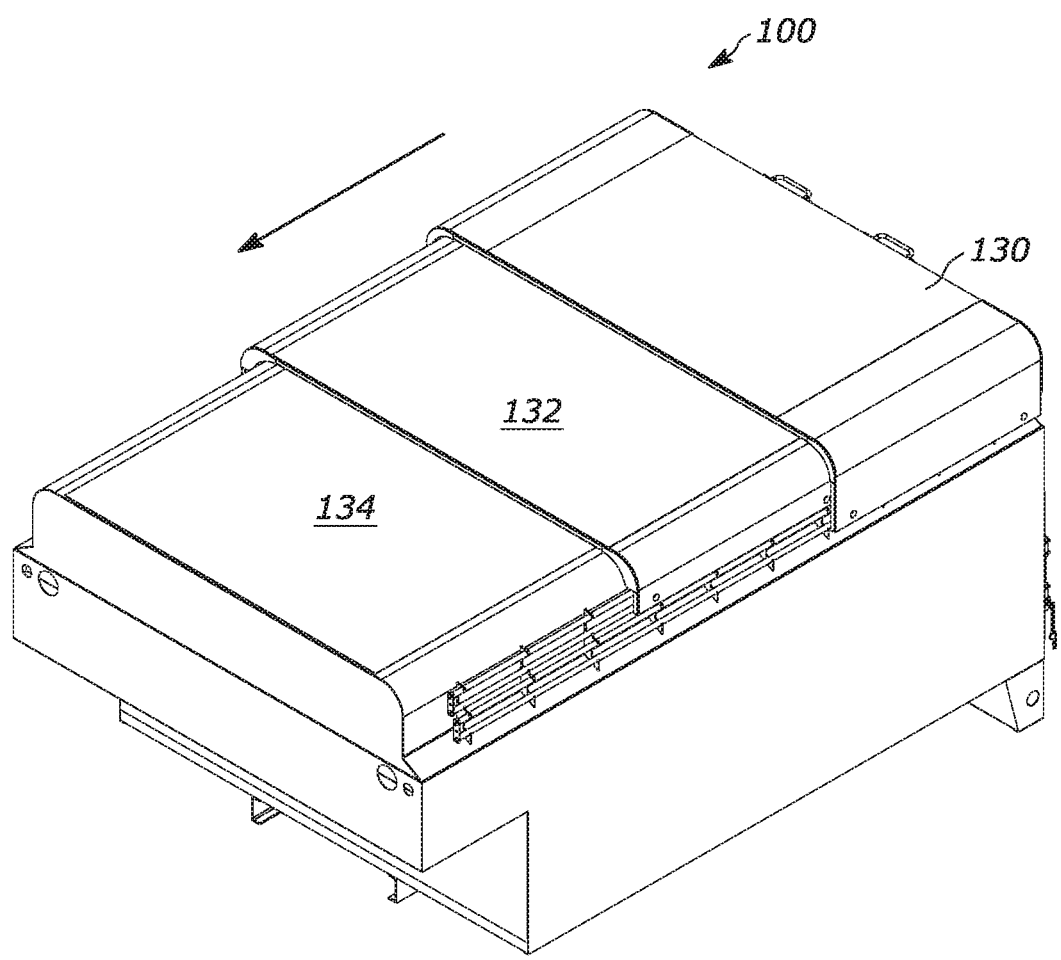
FIGS. 24-34 are upper-right perspective views illustrating a truck body opening and closing motions of a dynamic roof top in accordance with one example embodiment of the present disclosure.
Figure 25:
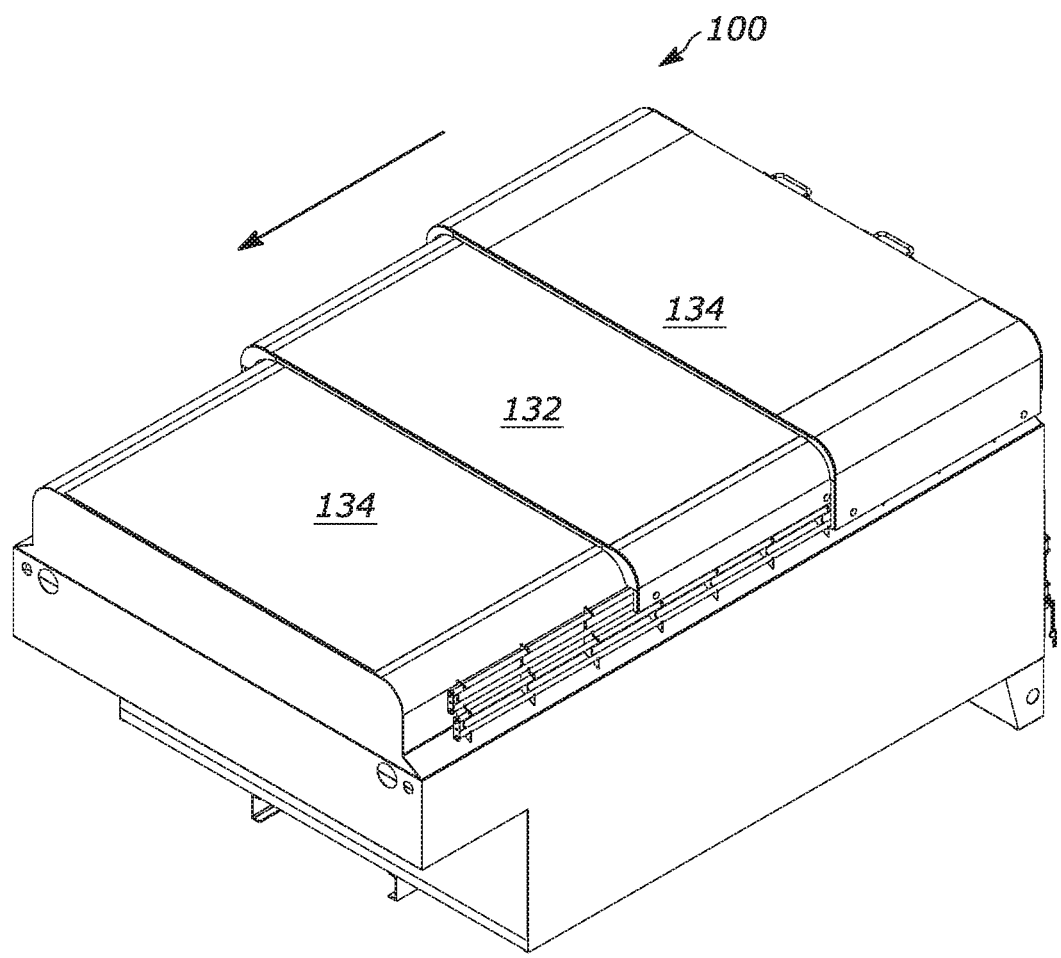
Figure 26:
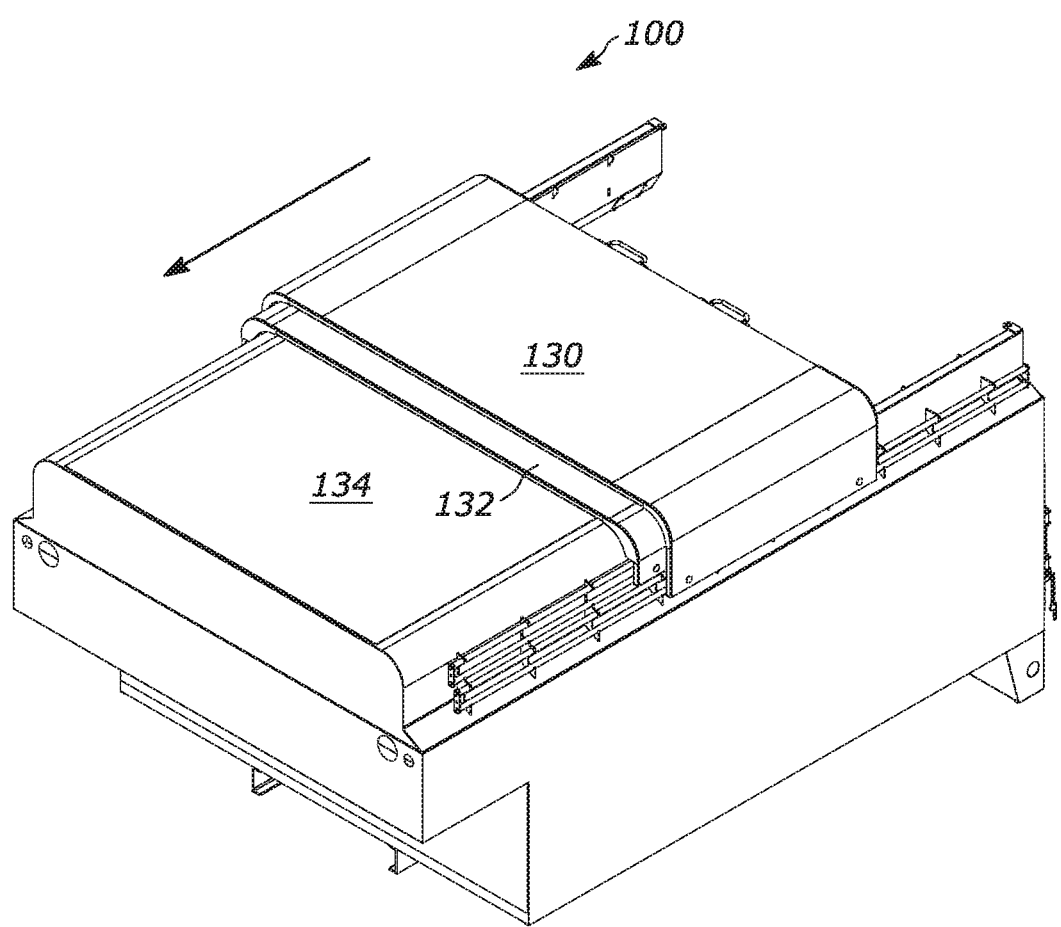
Figure 27:
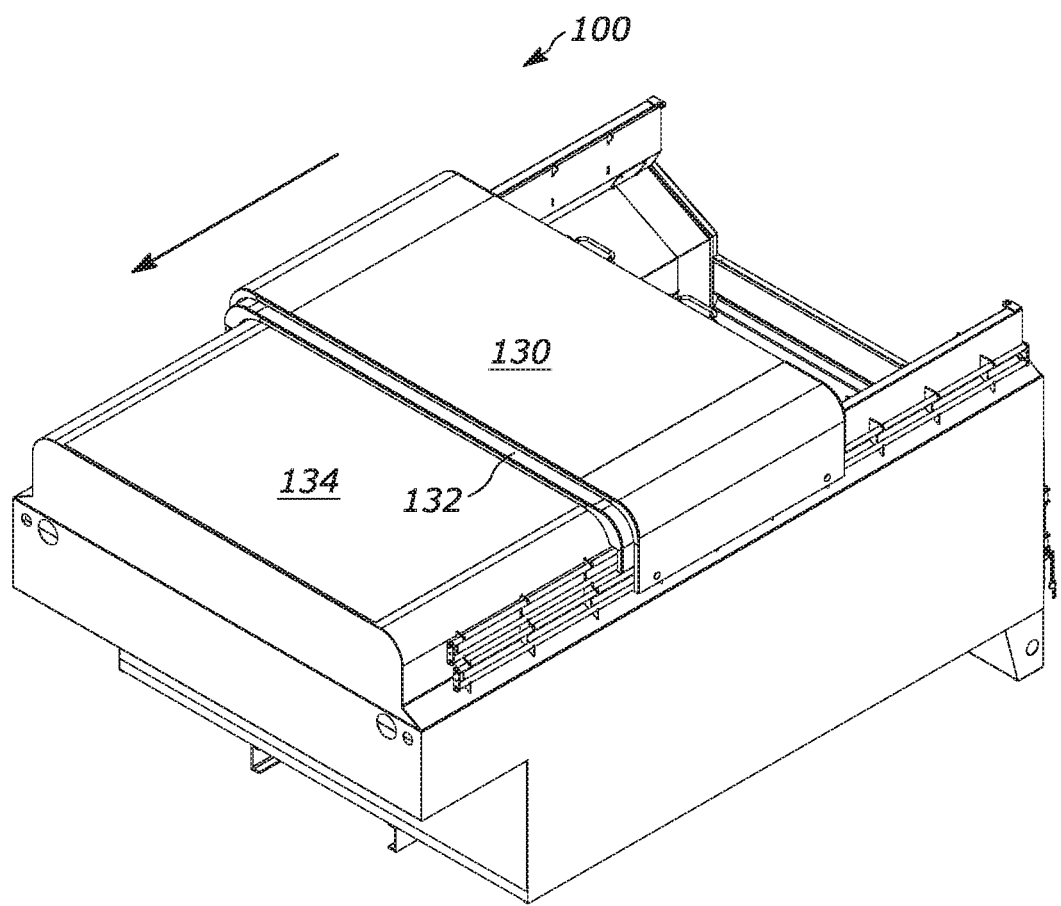
Figure 28:
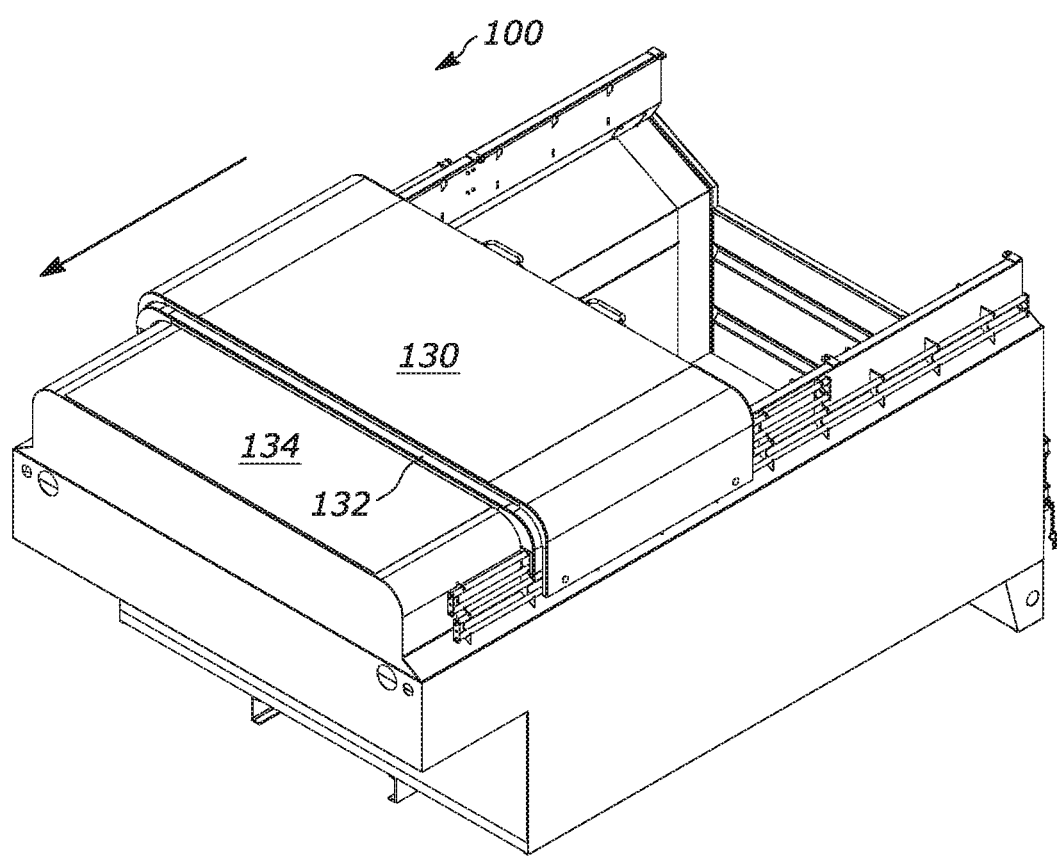
Figure 29:
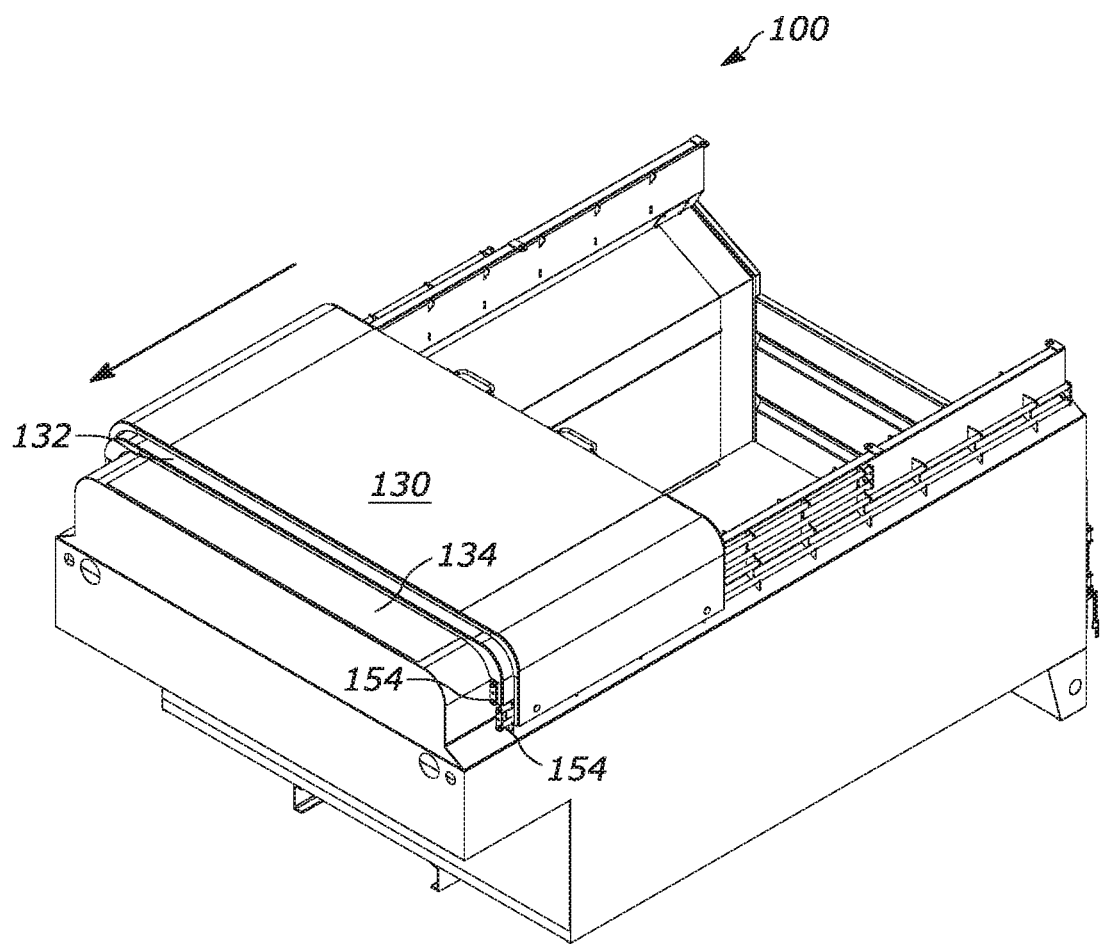

Illustrated in FIG. 23 is yet another example embodiment in which the second panel 132 can travel the entire length of the side walls 112 such that the second panel can be under the first panel 130 at any point along the truck body. It should be appreciated that while the first panel 130 envelopes the second panel 132, which envelopes the static panel 134, the sizing can be inverted such that the static panel 134 is the largest of all interlocking panels, allowing it to envelope the second panel 132, which the second panel would envelop the first panel 130 in a fully open or retracted position. Moreover, while three interlocking panels are illustrated 130, 132, and 134, more or less panels can be used, particularly for longer or shorter trucks. Such constructions are contemplated as being part of the present disclosure.

In the foregoing specification, specific embodiments have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising", "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art. In one non-limiting embodiment the terms are defined to be within for example 10%, in another possible embodiment within 5%, in another possible embodiment within 1%, and in another possible embodiment within 0.5%. The term "coupled" as used herein is defined as connected or in contact either temporarily or permanently, although not necessarily directly and not necessarily mechanically. A device or structure that is "configured" in a certain way is configured in at least that way, but may also be configured in ways that are not listed.

To the extent that the materials for any of the foregoing embodiments or components thereof are not specified, it is to be appreciated that suitable materials would be known by one of ordinary skill in the art for the intended purposes.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A dynamic roof top for a truck body, the dynamic roof top comprising:
    a dynamic panel having a plurality of wheels that translate the dynamic panel from an extended or closed position to a retracted or opened position and from said retracted or opened position to said extended or closed position;
    a static panel that allows said dynamic panel to overlap said static panel; and
    a rail system supported at least partially on an outside surface of a sub-wall for coupling arcuate ends of the static panel to sidewalls of a truck body, the rail system supported at least partially by the static portion, the rail system to allow said dynamic panel to translate from said extended or closed position to the retracted or opened position and from said retracted or open position to said extended or closed position.

2. The dynamic roof top for a truck body in claim 1 further comprising first and second sub-walls and said rail system comprising first and second rails coupled to respective first and second sub-walls.

3. The dynamic roof top for a truck body in claim 2 wherein said first and second rails each comprise an upper rail and a lower rail in which said plurality of wheels comprise a v-groove that interlocks said dynamic panel with said rail system.

4. The dynamic roof top for a truck body in claim 2 wherein said first and second sub-walls and first and second rails are spaced by a planar surface located in said dynamic panel.

5. The dynamic roof top for a truck body in claim 3 wherein said first and second sub-walls and first and second rails are spaced by a planar surface located in said dynamic panel.

6. The dynamic roof top for a truck body in claim 1 wherein said dynamic panel further comprises first and second dynamic panels.

7. The dynamic roof top for a truck body in claim 6 further comprising first and second sub-walls and said rail system comprising first and second rails coupled to respective first and second sub-walls and third and fourth rails coupled to respective first and second sub-walls, said first and second rails translate said first dynamic panel from said extended or closed position to a retracted or opened position and from said retracted or open position to said extended or closed position, said third and fourth rails translate said second dynamic panel from said extended or closed position to a retracted or opened position and from said retracted or open position to said extended or closed position.

8. The dynamic roof top for a truck body in claim 7 wherein said first, second, third, and fourth rails each comprise an upper rail and a lower rail in which said plurality of wheels comprise a v-groove that interlock said first and second dynamic panels with said rail system.

9. The dynamic roof top for a truck body in claim 7 further comprising a spring-loaded catch that couples said first dynamic panel with said second dynamic panel.

10. The dynamic roof top for a truck body in claim 7 further comprising a contact stop located on said first dynamic panel that engage a contact plate located on said second dynamic panel that engages said contact stop when said first dynamic panel engages said second dynamic panel such that the first and second dynamic panels translate in unison to a retracted or opened position.

11. The dynamic roof top for a truck body in claim 7 further comprising a plurality of stops located on said first and second sub-walls that terminate the translation of said first and second dynamic panels upon reaching said extended or closed position.

12. A method of providing a closure for a roof top for a truck body, the method comprising the steps of:
providing at least one dynamic panel moveably supported by sub-walls coupled to first and second sidewalls that span a truck bed;
translating the at least one dynamic panel from an extended or closed position to a retracted or opened position and from said retracted or opened position to said extended or closed position by a rail system comprising first and second rails each located on an exterior surface of the sub-walls, said first and second rails having a plurality of wheels coupled to said at least one dynamic panel, the wheels rotate along said track during translation of said dynamic panel; and
providing a static panel that upon translating said at least one dynamic panel to the open or retracted position is overlapped by said at least one dynamic panel, a portion of said sub-walls coupling the static panel to said first and second sidewalls, the rail system supported at least partially by the sub-walls.

13. The method of claim 12 wherein said the step of providing at least one dynamic roof panel comprises providing first and second dynamic panels.

14. The method of claim 12 further comprising the step of providing an upper rail and a lower rail to said first and second rails and providing each of said plurality of wheels with a v-groove that interlocks said at least one dynamic panel with said rail system.

15. The method of claim 13 further comprising the step of providing an upper rail and a lower rail to said first and second rails and providing and third and fourth rails each with a respective upper and lower rail and of said plurality of wheels with a v-groove that interlocks said first and second dynamic panels with said rail system.

16. The method of claim 12 further comprising the step of providing a plurality of stops located on at least one of said first and second walls that terminate the translation of at least one dynamic panel upon reaching said extended or closed position.

17. A dynamic roof top for a truck body, the dynamic roof top comprising:
first and second dynamic panels that translate from an extended or closed position to a retracted or opened position and from said retracted or opened position to said extended or closed position; the translation of said dynamic panels occurring manually by an operator of said dynamic roof top;
a static panel that is overlapped by said first and second dynamic panels, further wherein said second dynamic panel is enveloped by both the first and static panels when said first and second panels translate into the retracted or closed position;
a rail system to allow said first and second dynamic panels to translate from said extended or closed position to the retracted or opened position and from said retracted or open position to said extended or closed position; and
first and second sub-walls and said rail system comprising first and second rails coupled to outside surfaces of respective first and second sub-walls and third and fourth rails coupled to outside surfaces of respective first and second sub-walls, said first and second rails translate said first dynamic panel from said extended or closed position to the retracted or opened position and from said retracted or open position to said extended or closed position, said third and fourth rails translate said second dynamic panel from said extended or closed position to a retracted or opened position and from said retracted or open position to said extended or closed position; wherein said first and second rails translating said first dynamic panel operate independently of said third and fourth rails translating said second dynamic panel, and said first and second rails comprise differing lengths from said third and fourth rails based on travel distance of said first and second dynamic panels, further wherein, the first and second rails are supported at least partially on a portion of the first and second sub-walls located between the static panel and sidewalls of a truck body supporting the dynamic roof top.

18. The dynamic roof top for a truck body of claim 17 further comprising a plurality of wheels that translate the said first and second dynamic panels from said extended or closed position to a retracted or opened position and from said retracted or opened position to said extended or closed position.

19. The dynamic roof top for a truck in claim 18 wherein said first and second rails each comprise an upper rail and a lower rail in which said plurality of wheels comprise a v-groove that interlocks said first dynamic panel with said rail system and said third and fourth rails each comprise an upper rail and a lower rail in which said plurality of wheels comprise a v-groove that interlocks said second dynamic panel with said rail system.

20. The dynamic roof top for a truck in claim 19 wherein one of said first dynamic panel and said second dynamic panel includes a handle for the manual translation of the first and second dynamic panels for translating between said opened and said closed positions during use.

\* \* \* \* \*